US010353823B2

(12) United States Patent
Brokish et al.

(10) Patent No.: US 10,353,823 B2
(45) Date of Patent: *Jul. 16, 2019

(54) LESS-SECURE PROCESSORS, INTEGRATED CIRCUITS, WIRELESS COMMUNICATIONS APPARATUS, METHODS AND PROCESSES OF MAKING

(71) Applicant: TEXAS INSTRUMENTS INCORPORATED, Dallas, TX (US)

(72) Inventors: Charles W. Brokish, Poynette, WI (US); Narendar Madurai Shankar, Dallas, TX (US); Erdal Paksoy, Richardson, TX (US); Steve Karouby, Antibes (FR); Olivier Schuepbach, Antibes (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/857,961

(22) Filed: Sep. 18, 2015

(65) Prior Publication Data

US 2016/0013110 A1 Jan. 14, 2016

Related U.S. Application Data

(62) Division of application No. 14/657,793, filed on Mar. 13, 2015, now abandoned, and a division of
(Continued)

(51) Int. Cl.
*G06F 21/57* (2013.01)
*G06F 12/1009* (2016.01)
(Continued)

(52) U.S. Cl.
CPC ...... *G06F 12/1009* (2013.01); *G06F 12/0246* (2013.01); *G06F 12/0638* (2013.01);
(Continued)

(58) Field of Classification Search
None
See application file for complete search history.

(56) References Cited

U.S. PATENT DOCUMENTS 6,861,865 B1 * 3/2005 Carlson ............ H03K 19/00392
326/10
7,117,352 B1 * 10/2006 Giles ................. G01R 31/31719
713/2

(Continued)

*Primary Examiner* — Fahmida Rahman
(74) *Attorney, Agent, or Firm* — Kenneth Liu; Charles A. Brill; Frank D. Cimino

(57) ABSTRACT

An integrated circuit (122) includes an on-chip boot ROM (132) holding boot code, a non-volatile security identification element (140) having non-volatile information determining a less secure type or more secure type, and a processor (130). The processor (130) is coupled to the on-chip boot ROM (132) and to the non-volatile security identification element (140) to selectively execute boot code depending on the non-volatile information of the non-volatile security identification element (140). Other technology such as processors, methods of operation, processes of manufacture, wireless communications apparatus, and wireless handsets are also disclosed.

28 Claims, 14 Drawing Sheets

Related U.S. Application Data application No. 13/345,912, filed on Jan. 9, 2012, now Pat. No. 8,996,848, which is a division of application No. 10/915,830, filed on Aug. 10, 2004, now Pat. No. 8,112,618.

(60) Provisional application No. 60/561,129, filed on Apr. 8, 2004.

(51) Int. Cl.
| | |
|---|---|
| *G06F 21/74* | (2013.01) |
| *G06F 21/78* | (2013.01) |
| *H01L 21/66* | (2006.01) |
| *H01L 23/525* | (2006.01) |
| *G06F 12/02* | (2006.01) |
| *G06F 12/06* | (2006.01) |
| *G06F 12/1018* | (2016.01) |
| *G06F 12/12* | (2016.01) |
| *G06F 12/14* | (2006.01) |
| *H04L 9/32* | (2006.01) |

(52) U.S. Cl.
CPC .......... *G06F 12/1018* (2013.01); *G06F 12/12* (2013.01); *G06F 12/145* (2013.01); *G06F 12/1408* (2013.01); *G06F 21/575* (2013.01); *G06F 21/74* (2013.01); *G06F 21/78* (2013.01); *H01L 22/22* (2013.01); *H01L 23/5256* (2013.01); *H04L 9/3236* (2013.01); *G06F 2212/1052* (2013.01); *G06F 2212/205* (2013.01); *G06F 2212/7201* (2013.01); *G06F 2221/2105* (2013.01); *G06F 2221/2113* (2013.01); *H01L 2924/0002* (2013.01)

(56) References Cited

U.S. PATENT DOCUMENTS

| | | | |
|---|---|---|---|
| 8,768,642 B2* | 7/2014 | Diamond | G01R 31/318544 700/1 |
| 2003/0120915 A1* | 6/2003 | Kleinsteiber | H04L 49/10 713/153 |
| 2005/0033969 A1* | 2/2005 | Kiiveri | G06F 21/57 713/189 |
| 2005/0251358 A1* | 11/2005 | Van Dyke | G01R 31/318544 702/117 |

* cited by examiner

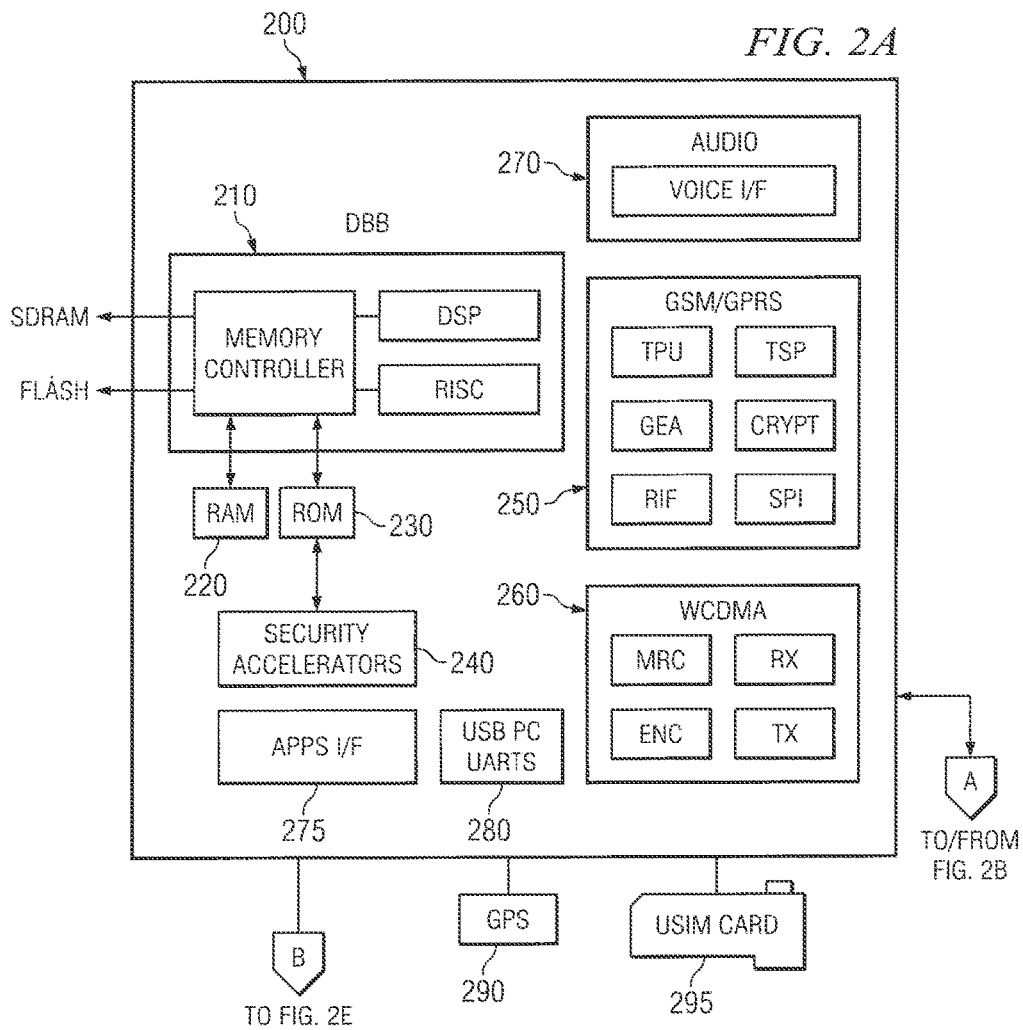
*FIG. 2A*
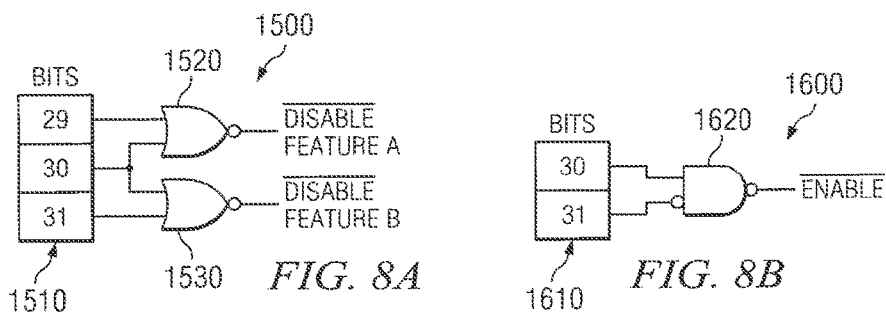
*FIG. 8A*  *FIG. 8B*

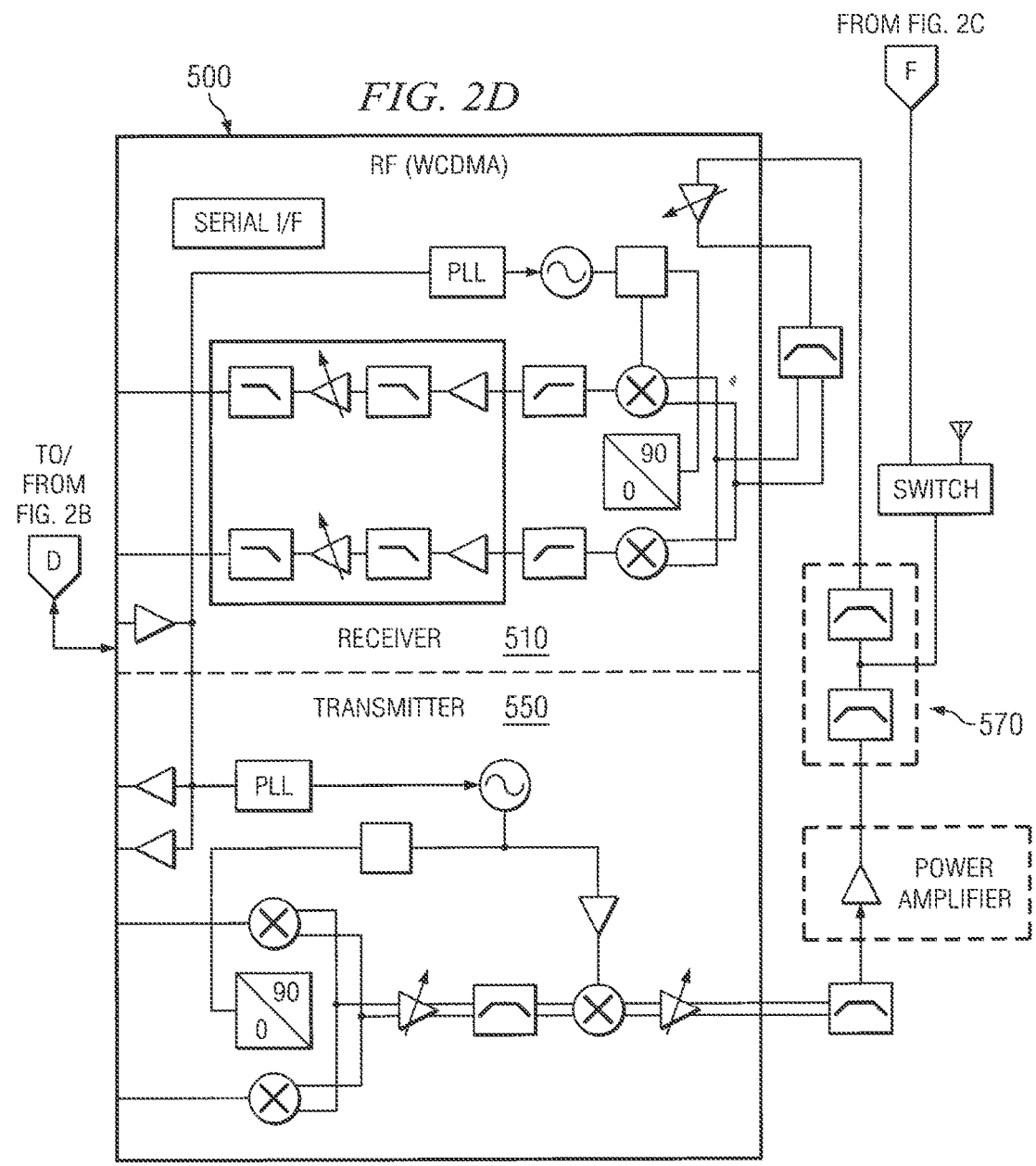

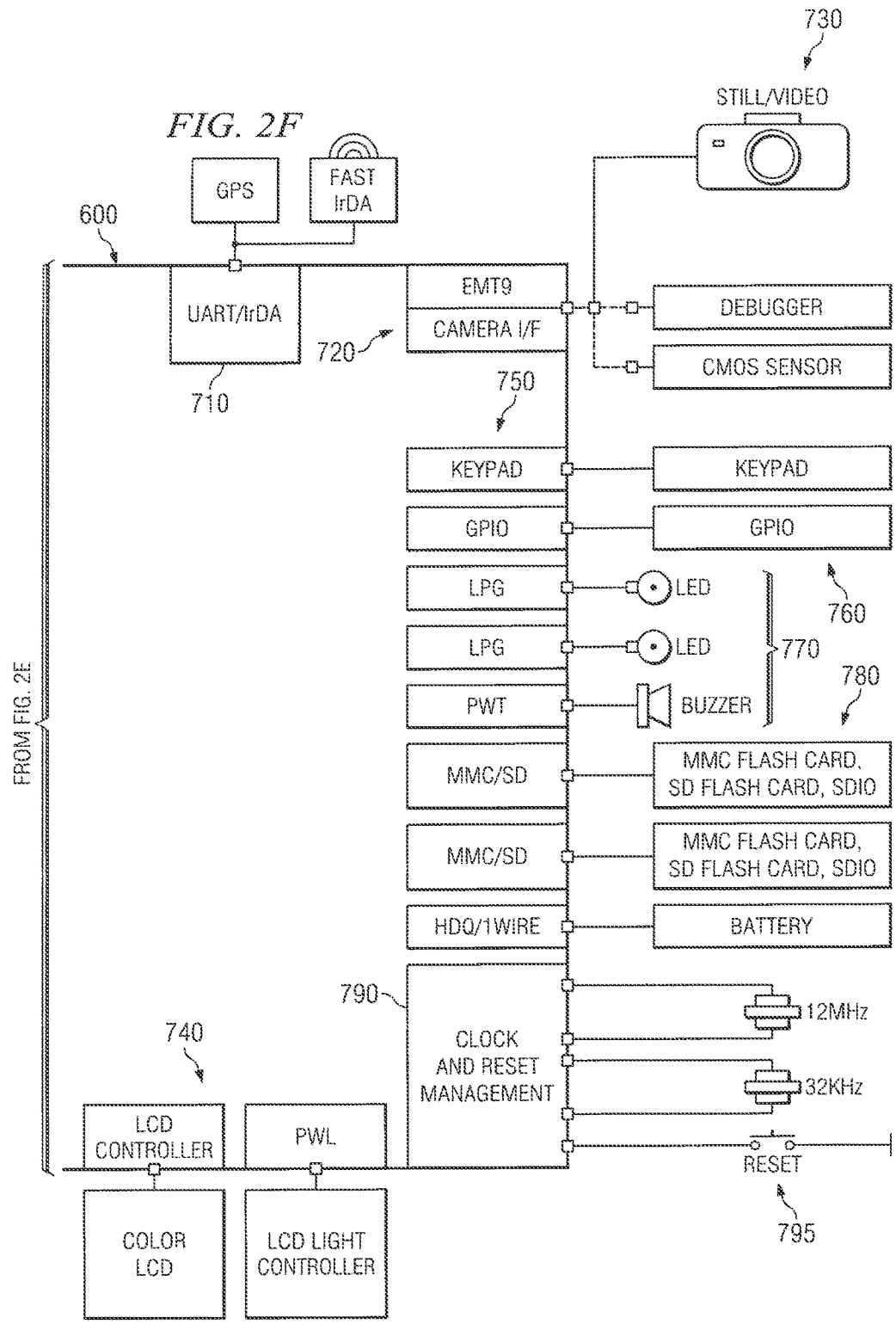

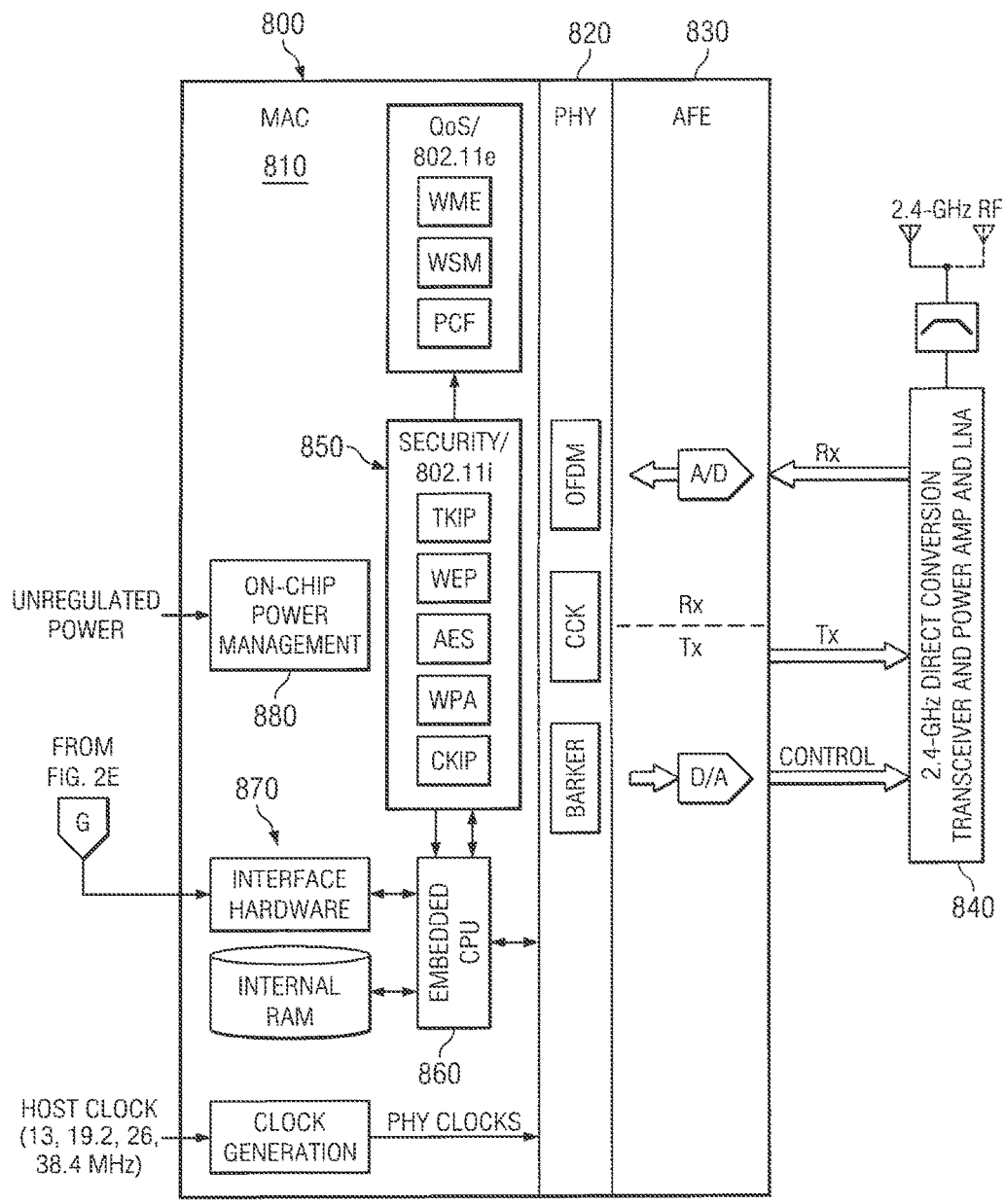

LESS-SECURE PROCESSORS, INTEGRATED CIRCUITS, WIRELESS COMMUNICATIONS APPARATUS, METHODS AND PROCESSES OF MAKING

CLAIM OF PRIORITY

This application: is a divisional of U.S. patent application Ser. No. 14/657,793 filed Mar. 13, 2015, which is a divisional of U.S. patent application Ser. No. 13/345,912 filed Jan. 9, 2012 now U.S. Pat. No. 8,996,848, which is a divisional of U.S. patent application Ser. No. 10/915,830 filed Aug. 10, 2004, now U.S. Pat. No. 8,112,618, which claims priority from U.S. Provisional Patent Application No. 60/561,129 filed Apr. 8, 2004.

STATEMENT REGARDING FEDERALLY SPONSORED RESEARCH OR DEVELOPMENT

Not applicable.

BACKGROUND OF THE INVENTION

This invention is in the field of information and communications, and is more specifically directed to improved processes, circuits, devices, and systems for varied levels of security and other information and communication processing purposes, and processes of making them. Without limitation, the background is further described in connection with wireless communications processing.

Wireless communications, of many types, have gained increasing popularity in recent years. The mobile wireless (or "cellular") telephone has become ubiquitous around the world. Mobile telephony has recently begun to communicate video and digital data, in addition to voice. Wireless modems, for communicating computer data over a wide area network, using mobile wireless telephone channels and techniques are also available.

Wireless data communications in wireless local area networks (WLAN), such as that operating according to the well-known IEEE 802.11 standard, has become especially popular in a wide range of installations, ranging from home networks to commercial establishments. Short-range wireless data communication according to the "Bluetooth" technology permits computer peripherals to communicate with a personal computer or workstation within the same room. Numerous other wireless technologies exist and are emerging.

Security techniques are used to improve the security of retail and other business commercial transactions in electronic commerce and to improve the security of communications wherever personal and/or commercial privacy is desirable. Security is important in both wireline and wireless communications.

Processors of various types, including digital signal processing (DSP) chips and/or other integrated circuit devices are important to these systems and applications. Reducing the cost of manufacture and providing a variety of circuit and system products with performance features for different market segments are important goals in DSPs, integrated circuits generally and system-on-a-chip (SOC) design.

Coassigned U.S. Patent Application Publication 2004/0025010 of J. Azema, E. Balard, A. Chateau, E. Paksoy, and M. Leclercq, describes a computing platform that binds system firmware to a particular computing platform using a manufacturer certificate. A die identification number associated with an individual device is stored in a fused memory array (eFuse) at the time of manufacture and can be compared with the manufacturer certificate to bind the code to the platform.

In the security area, for instance, a problem arises where a first processor has some features and a second processor has additional operational features plus security features. Unless more alternative products can be economically provided, customers who want the additional operational features may feel compelled to use the security features of the second processor device, whether they want all the security or not. In other words, users want various features of a secure processor but in various market segments where lower security is acceptable. However, providing different software and hardware product releases can increase manufacturing costs unacceptably and pose potential security issues for higher security devices.

Further alternative and advantageous solutions would, accordingly, be desirable in the art.

SUMMARY OF THE INVENTION

Generally and in one form of the invention, an integrated circuit includes an on-chip boot ROM holding boot code. Also included is a non-volatile security identification element having non-volatile information determining a less secure type or more secure type. A processor is coupled to the on-chip boot ROM and to the non-volatile security identification element to selectively execute the boot code depending on the non-volatile information of the non-volatile security identification element.

Generally, another form of the invention involves a method for secure or less secure operation of a processor including storing an identification value and boot code. Depending on the identification value, the method executes a selected boot sequence from the boot code either for more secure operation or for less secure operation. Further, the method isolates a portion of boot code when the identification value represents less secure operation.

Generally, a further form of the invention involves a process of manufacturing integrated circuit devices wherein the process has a yield subject to a yield loss in manufacturing. The process includes providing integrated circuit devices which have a first feature and a second feature, the second feature having a state of disablement or enablement dependent on an on-chip alterable non-volatile element. The integrated circuit devices so made are tested with the second feature enabled thereby identifying a first group of the devices that pass the testing of both the first feature and the second feature, and a second group of the devices that pass the testing of the first feature and do not pass the testing of the second feature. The non-volatile element is altered in a plurality of devices from the second group.

Generally, a still further form of the invention involves wireless communications apparatus including a power-on reset circuit, a boot store holding boot code, a security identification store having non-volatile bits representing whether the wireless communications apparatus is a less secure type or more secure type, and circuitry. The circuitry is coupled to the boot store, to the power-on reset circuit and to the security identification bits to selectively execute boot code depending on the non-volatile information of the security identification bits and responsive to a signal from the power-on reset circuit to enter secure mode and perform a secure-to-less-secure conversion.

Other forms of the invention involving processes of manufacture, processes of operation, circuits, devices, wireless communications products, wireless handsets and systems are disclosed and claimed.

BRIEF DESCRIPTION OF THE DRAWINGS

FIGS. 2A-2G are block diagrams of inventive integrated circuit chips for use in the blocks of the communications system of FIG. 1.

FIG. 2A is a block diagram of an integrated circuit including a digital baseband section, the integrated circuit provided on a printed circuit board system of integrated circuit chips for use in one or more of the system blocks of FIG. 1.

FIG. 2B is a block diagram of an integrated circuit including an analog baseband section, the integrated circuit provided on a printed circuit board system of integrated circuit chips for use in one or more of the system blocks of FIG. 1.

FIG. 2C is a block diagram of an integrated circuit including a GSM/GPRS RF (radio frequency) unit, the integrated circuit on a printed circuit board system of integrated circuit chips for use in one or more of the system blocks of FIG. 1.

FIG. 2D is a block diagram of an integrated circuit including a WCDMA (wideband code division multiple access) RF (radio frequency) unit, the integrated circuit on a printed circuit board system of integrated circuit chips for use in one or more of the system blocks of FIG. 1.

FIGS. 2E and 2F are two halves of a block diagram of an integrated circuit including application processor circuitry, the integrated circuit provided with off-chip peripherals on a printed circuit board system of integrated circuit chips for use in one or more of the system blocks of FIG. 1.

FIG. 2G is a block diagram of a WLAN integrated circuit including MAC (media access controller), PHY (physical layer) and AFE (analog front end), the integrated circuit on a printed circuit board system of integrated circuit chips for use in one or more of the system blocks of FIG. 1.

FIG. 4A shows branches to selected boot modes and Normal Boot and GP Full Boot are included in FIG. 4A. FIG. 4B shows process steps pertaining to Power-On Reset. FIG. 4C shows process steps pertaining to GP Fast Boot mode.

FIGS. 8A and 8B are schematic diagrams of examples of logic in the applications processor 600 of FIGS. 2E and 2F for establishing feature disables and enables for purposes of the processes of FIGS. 3, 4A, 4B, 4C, 5, 6, and 7.

DETAILED DESCRIPTION OF EMBODIMENTS

Figure 1:
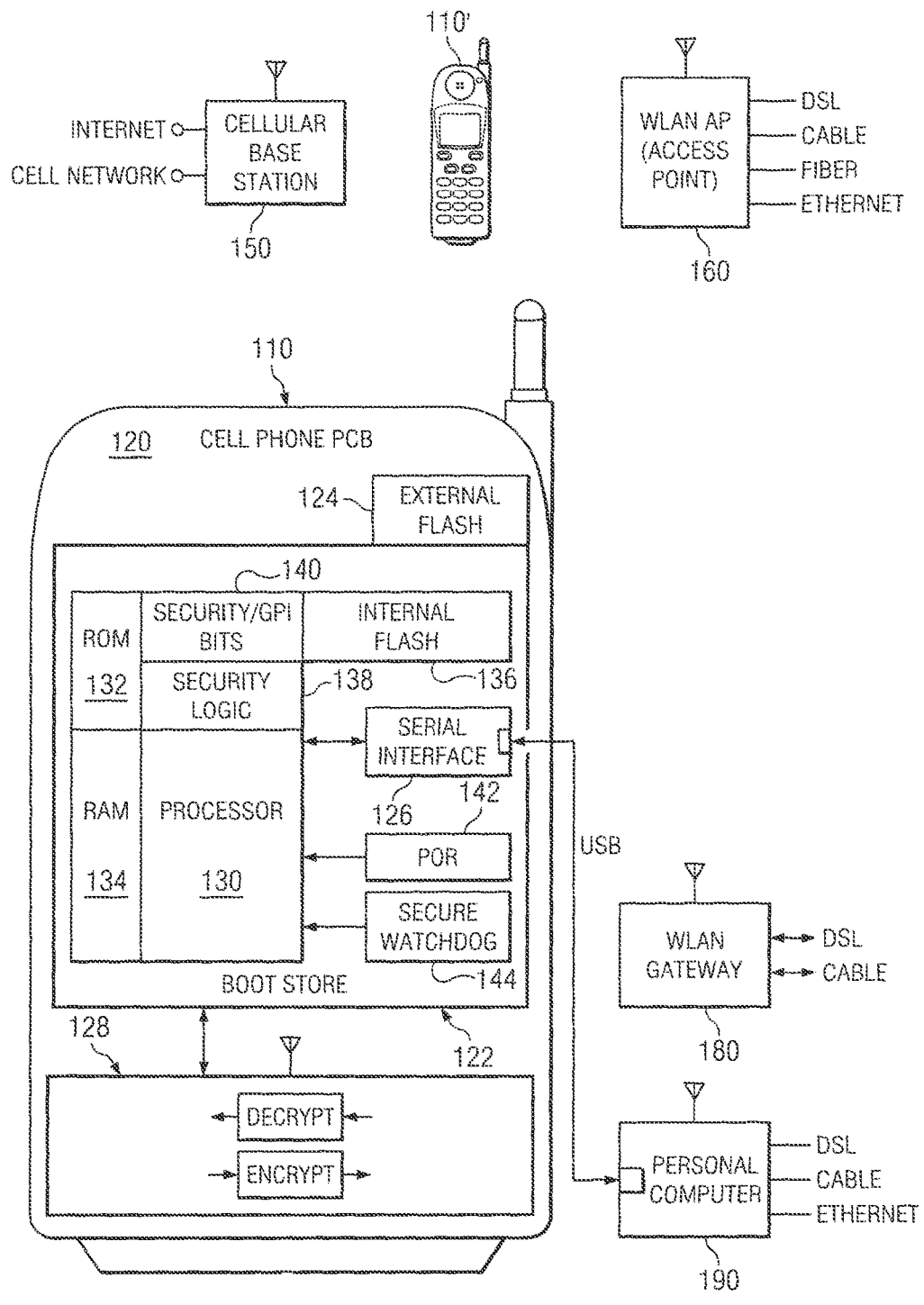
FIG. 1 is a pictorial diagram of a communications system including system blocks, for example a cellular base station, a WLAN AP (wireless local area network access point), a WLAN gateway, a personal computer, and two cellular telephone handsets, any one, some or all of the foregoing improved according to the invention.

In FIG. 1 an improved communications system 100 has system blocks with selectively-determinable security level. Any or all of the system blocks, such as cellular telephone and data handsets 110 and 110', a cellular (telephony and data) base station 150, a WLAN AP (wireless local area network access point, IEEE 802.11 or otherwise) 160, a WLAN gateway 180, and a personal computer (PC) 190, communicate with each other in communications system 100. Each of the system blocks 110, 110', 150, 160, 180, 190 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), fiber (fiber optic cable to premises), and Ethernet wideband network. Cellular base station 150 two-way communicates with the handsets 110, 110', with the Internet, with cellular communications networks and with PSTN (public switched telephone network).

In this way advanced networking capability for services and content, such as cellular telephony and data, audio, music, voice, video, e-mail, e-commerce, file transfer and other data services, internet, world wide web browsing, TCP/IP (transmission control protocol/Internet protocol), voice over packet and voice over Internet protocol (VoP/VoIP), and other services accommodates and provides security for secure utilization and enjoyment appropriate to the just-listed and other particular applications, while recognizing market demand for different levels of security. The embodiments, applications and system blocks disclosed herein are suitably implemented are suitably implemented in fixed, portable, mobile, automotive, seaborne, and airborne, communications, control, and other apparatus.

For example, handset 110 is improved for selectively determinable security when manufactured. Handset 110 remains interoperable and able to communicate with all other similarly improved and unimproved system blocks of communications system 100. On a cell phone printed circuit board (PCB) 120 in handset 110, there is provided a processor integrated circuit 122, an external flash memory 124, and a serial interface 126. Serial interface 126 is suitably a wireline interface, such as a USB interface connected by a USB line to the personal computer 190 when the user desires and for reception of software intercommunication and updating of information between the personal computer 190 (or other originating sources external to the handset 110) and the handset 110. Such intercommunication and updating also occur via WLAN, Bluetooth, or other wireless circuitry 128.

Processor integrated circuit 122 includes at least one processor (or central processing unit CPU) block 130 coupled to an internal (on-chip read-only memory) ROM 132, an internal (on-chip random access memory) RAM 134, and an internal (on-chip) flash memory 136. A security logic circuit 138 is coupled to secure-or-general-purpose-identification value (Security/GPI) bits 140 of a non-volatile one-time alterable Production ID register or array of electronic fuses (E-Fuses). Such E-Fuses are an example of an identification code storage holding an identification value.

These E-Fuses are programmed in different units of the handset 110, 110' to thereby provide a security identification store having non-volatile bits representing whether the wireless handset (or other system block) is a less secure ("GP" herein) type or more high-security type ("HS" herein). Depending on the Security/GPI bits 140, boot code residing in ROM 132 responds differently to a Power-On Reset (POR) circuit 142 and to a secure watchdog circuit 144 coupled to processor 130.

It will be noted that the words "internal" and "external" as applied to a circuit or chip respectively refer to being on-chip or off-chip of the applications processor chip 122. All items are assumed to be internal to the apparatus (such as a handset, base station, access point, gateway, PC, or other apparatus) except where the words "external to" are used with the name of the apparatus, such as "external to the handset."

ROM 132 provides a boot storage having boot code that is executable in different boot sequences. One or more of RAM 134, internal flash 136, and external flash 124 are also suitably used to supplement ROM 132 for boot storage purposes. Processor 130 is an example of circuitry coupled to the identification code storage 140 to execute a selected boot sequence from the boot code in the boot storage either for more-secure operation or for less-secure operation of the processor. Processor 130 is also responsive to one or more other inputs to execute further selected boot sequences from the boot code, or boot modes in a boot sequence. These other inputs are suitably provided by hardware on the PCB 120 connecting to a boot mode input pin of chip 122, configuration values stored in ROM 132 or other memories, and by the POR 142. The processor 130 and circuitry is further responsive to the one or more signals representing a particular boot mode at input(s) for boot mode, to execute the selected boot sequence according to the particular boot mode. Further, the boot code in the boot storage suitably includes code that loads software external to the wireless handset via the wireless interface(s) 128 and/or the serial interface 126 into flash memory 136 depending on the selected boot sequence.

Processor 130 is coupled to the on-chip boot ROM 132, to the power-on reset circuit 142 and to the security identification bits 140 to selectively execute boot code depending on the non-volatile information of the security identification bits 140. Processor 130 is responsive to a security identification value represented by the bits 140 to execute a selected boot from boot storage either for more-secure (HS) operation or for less-secure operation of the processor 130. When the security identification bits represent GP (security bypass or lower security option) the processor 130 is, among other functions, responsive to a signal from the power-on reset circuit 142 to enter secure mode and perform a higher-security to lower-security (secure-to-GP) conversion. Also, as noted above, processor 130 has an input for boot type and further responds to a signal at the input for boot type, to execute a selected boot sequence from two or more possible boot sequences.

Remarkably, the apparatus, methods, processes and devices which have security identification bits providing for lower-security operations do not impair the security of other units of apparatus which have security identification bits providing for higher-security (HS) operations. In other words the same boot code is suitably used for both GP and HS versions of a given handset 110 or 110', and this boot code is resistant to hacking of the security features in the boot code for handsets that exercise the security features, even though other units of the handset have same boot code which responds to another set of the security bits for GP operations where certain security features are bypassed. In other words, the GP handset resists hacking. Thus, the GP handset does not compromise the security of HS versions of the handset.

FIGS. 2A-2G illustrate inventive integrated circuit chips for use in the blocks of the communications system 100 of FIG. 1. The skilled worker uses and adapts the integrated circuits to the particular parts of the communications system 100 as appropriate to the functions intended. For conciseness of description, the integrated circuits are described with particular reference to use of all of them in the cellular telephone handsets 110 and 110' by way of example. Also, the architecture of integrated circuit 122 is suitably incorporated into one or more of integrated circuit 200 of FIG. 2A, integrated circuit 600 of FIGS. 2E and 2F, and integrated circuit 800 of FIG. 2G, for instance.

It is contemplated that the skilled worker uses each of the integrated circuits shown, or such selection from the complement of blocks therein provided into appropriate other integrated circuit chips, in a manner optimally combined or partitioned between the chips, to the extent needed by any of the applications supported by the cellular telephone base station 150, personal computer(s) 190 equipped with WLAN, WLAN access point 160 and WLAN gateway 180, as well as radios and televisions, fixed and portable entertainment units, routers, pagers, personal digital assistants (PDA), organizers, scanners, faxes, copiers, household appliances, office appliances, combinations thereof, and other application products now known or hereafter devised in which increased, or decreased, selectively determinable security of communication is desirable.

Figure 2B:
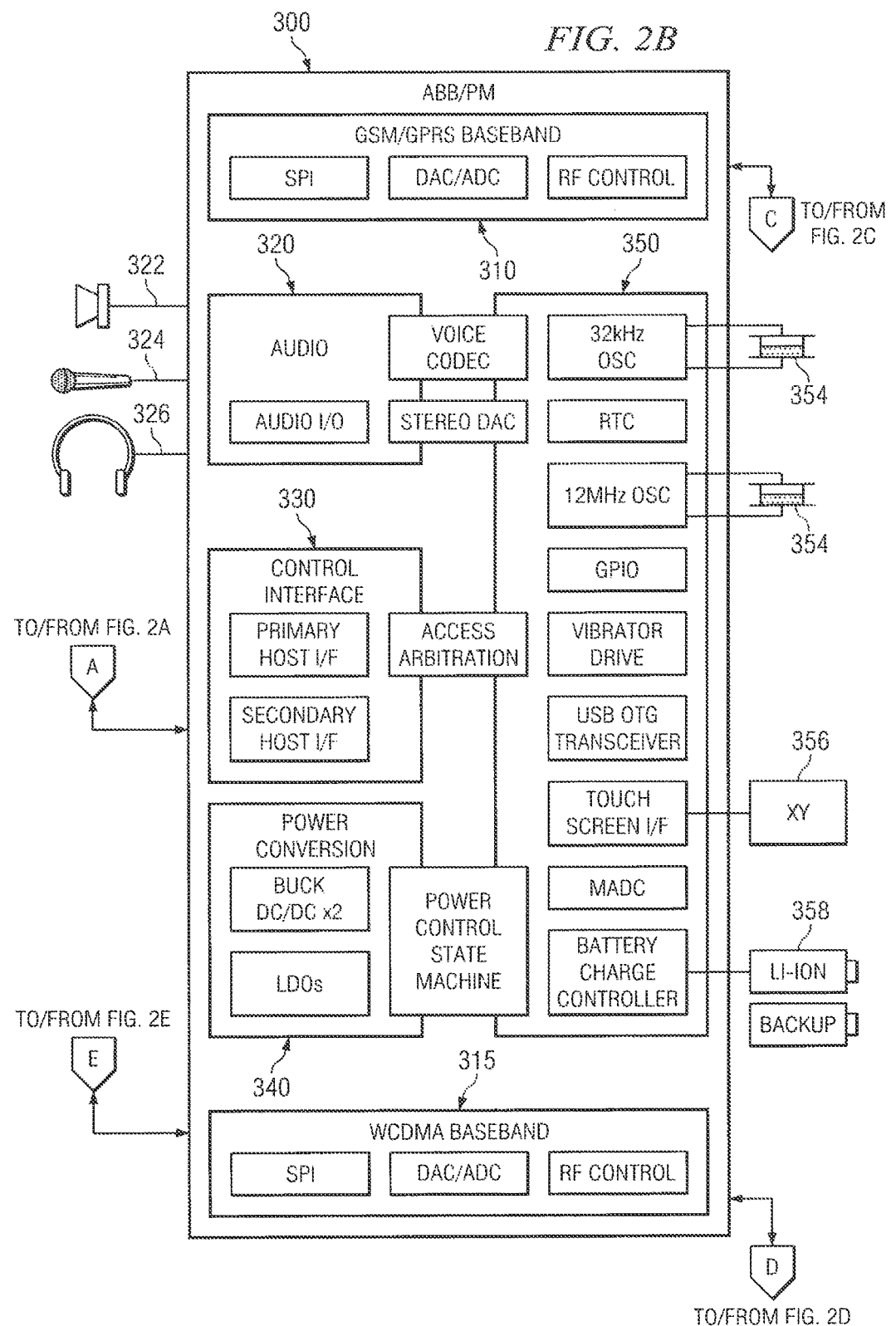

In FIG. 2A, an integrated circuit 200 includes a digital baseband (DBB) block 210 that has a RISC processor (such as MIPS core, ARM processor, or other suitable processor), a digital signal processor (DSP) such as a TMS320C55x DSP from Texas Instruments Incorporated or other digital signal processor, and a memory controller interfacing the RISC and the DSP to Flash memory and SDRAM (synchronous dynamic random access memory). On chip RAM 220 and on-chip ROM 230 also are accessible to the processors via the memory controller. Security accelerators block 240 provide additional computing power accessible, for instance, when the integrated circuit 200 is operated in a security level enabling the security accelerators block 240 and affording types of access to the security accelerators depending on the security level and/or security mode. Digital circuitry 250 supports and provides interfaces for one or more of GSM, GPRS, EDGE, and UMTS (Global System for Mobile communications, General Packet Radio Service, Enhanced Data Rates for Global Evolution, Universal Mobile Telecommunications System) wireless, with or without high speed digital data service, via the analog baseband chip 300 of FIG. 2B and GSM chip 400 of FIG. 2C. Digital circuitry 250 includes ciphering processor CRYPT for GSM A51 and/or A52 ciphering or and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 250.

Digital circuitry 260 provides codec for CDMA (Code Division Multiple Access), CDMA2000, and/or WCDMA (wideband CDMA) wireless with or without an HSDPA (High Speed Downlink Packet Access) (or 1×EV-DV, 1×EV-DO or 3×EV-DV) data feature via the analog baseband chip 300 of FIG. 2B and the CDMA chip 500 of FIG. 2D. Digital circuitry 260 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing). Block ENC has blocks for uplink and downlink supporting the F8 confidentiality algorithm and the F9 integrity algorithm of WCDMA or otherwise suitable encryption/decryption processes for the communications application.

Audio/voice block 270 supports audio and voice functions and interfacing. Applications interface block 275 couples the digital baseband 210 to the applications processor 600 of FIGS. 2E and 2F. Serial interface 280 interfaces from parallel on-chip digital busses to USB (Universal Serial Bus) of a PC (personal computer). Serial interface 280 includes UARTs (universal asynchronous receiver/transmitter circuit) for performing the conversion of data between parallel and serial lines. Chip 200 is coupled to location-determining circuitry 290 for GPS (Global Positioning System), and to a USIM (UMTS Subscriber Identity Module) 295 or other SIM.

Figure 2C:
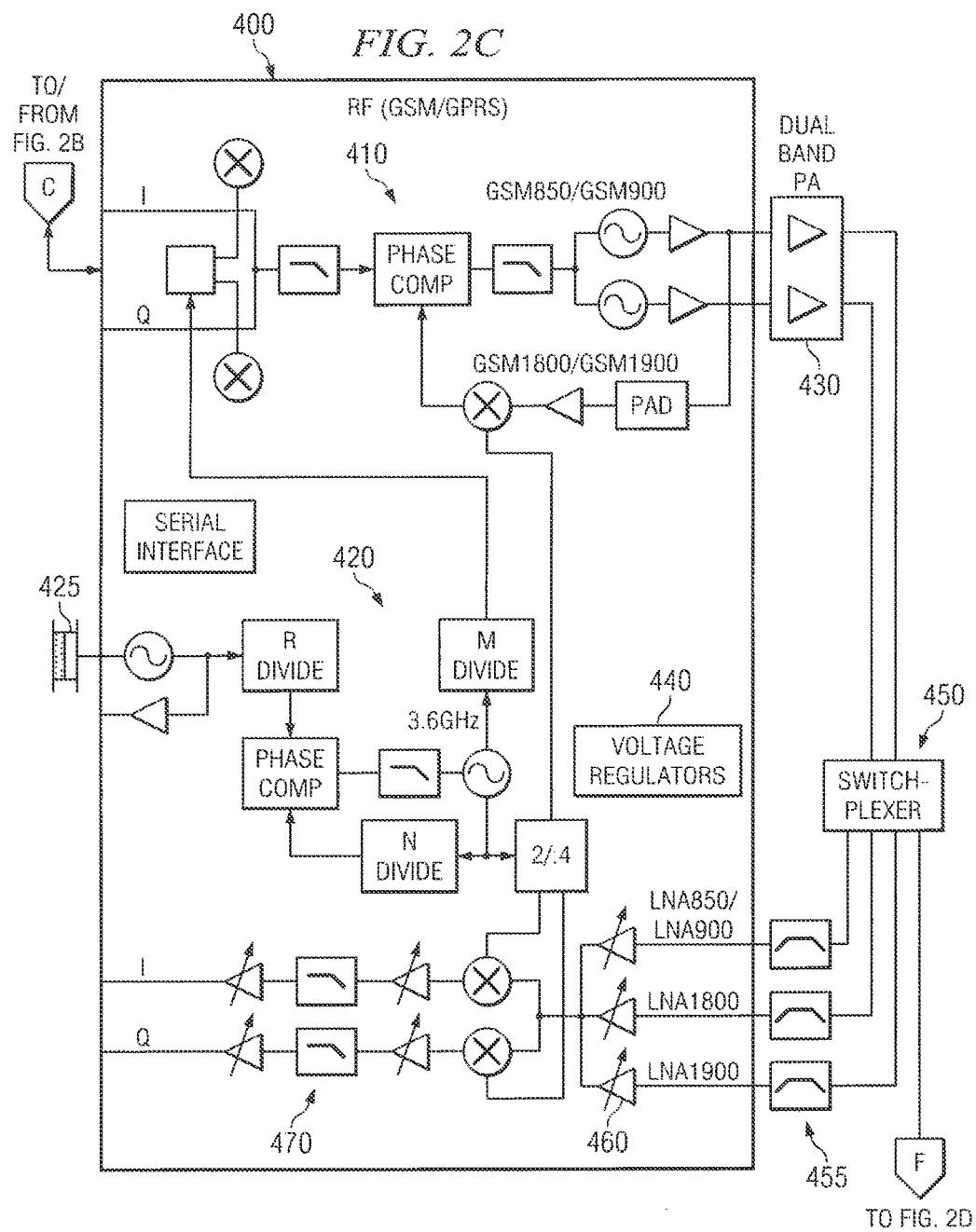

In FIG. 2B a mixed-signal integrated circuit 300 includes an analog baseband (ABB) block 310 for GSM/GPRS/EDGE/UMTS which includes SPI (Serial Port Interface), digital-to-analog/analog-to-digital conversion DAC/ADC block, and RF (radio frequency) Control pertaining to GSM/GPRS/EDGE/UMTS and coupled to RF (GSM etc.) chip 400 of FIG. 2C. Block 315 is an analogous ABB for WCDMA wireless and any associated HSDPA data (or 1xEV-DV, 1xEV-DO or 3xEV-DV data and/or voice) with its respective SPI (Serial Port Interface), digital-to-analog conversion DAC/ADC block, and RF Control pertaining to WCDMA and coupled to RF (WCDMA) chip 500 of FIG. 2D. An audio block 320 has audio I/O (input/output) circuits to a speaker 322, a microphone 324, and headphones 326. Audio block 320 is coupled to a voice codec and a stereo DAC (digital to analog converter), which in turn have the signal path coupled to the baseband blocks 310 and 315 with suitable encryption/decryption activated or not.

A control interface 330 has a primary host interface (I/F) and a secondary host interface to DBB-related integrated circuit 200 of FIG. 2A for the respective GSM and WCDMA paths. The integrated circuit 300 is also interfaced to the I2C port of applications processor chip 600 of FIG. 2E. Control interface 330 is also coupled via access arbitration circuitry to the interfaces in circuits 350 and the basebands 310 and 315. A power conversion block 340 includes buck voltage conversion circuitry for DC-to-DC conversion, and low-dropout (LDO) voltage regulators for power management/sleep mode of respective parts of the chip regulated by the LDOs. Power conversion block 340 provides information to and is responsive to a power control state machine shown between the power conversion block 340 and circuits 350.

Circuits 350 provide a 32 KHz oscillator and 12 MHz oscillator for clocking chip 300. The oscillators have frequencies determined by respective crystals 354A and 354B. Circuits 350 include a RTC real time clock (time/date functions), general purpose I/O, a vibrator drive (supplement to cell phone ringing features), a USB On-The-Go (OTG) transceiver, and touch screen interface. A touch screen 356 off-chip is connected to a touch screen interface on-chip. Batteries such as a lithium-ion battery 358 and backup battery provide power to the system and battery data on suitably provided separate lines from the battery pack. When needed, the battery also receives charging current from the Battery Charge Controller in analog circuit 350 which includes MADC (Monitoring ADC and analog input multiplexer such as for on-chip charging voltage and current, and battery voltage lines, and off-chip battery voltage, current, temperature) under control of the power control state machine.

In FIG. 2C an RF integrated circuit 400 includes a GSM/GPRS/EDGE/UMTS RF transmitter block 410 supported by oscillator circuitry 420 with off-chip crystal 425. Transmitter block 410 is fed by baseband block 310 of FIG. 2B. Transmitter block 410 drives an off-chip dual band RF power amplifier (PA) 430. On-chip voltage regulators 440 maintain appropriate voltage under conditions of varying power usage. Off-chip switchplexer 450 couples wireless antenna and switch circuitry in FIG. 2D to both the transmit portion 410, 430 in FIG. 2C and the receive portion next described. Switchplexer 450 is coupled via band-pass filters 455 to receiving LNAs 460 (low noise amplifiers) for 850/900 MHz, 1800 MHz, and 1900 MHz. Depending on the band in use, the output of LNAs 460 couples to GSM/GPRS/EDGE/UMTS demodulator 470 to produce the I/Q outputs thereof (in-phase, quadrature) to the GSM/GPRS/EDGE/UMTS baseband block 310 in FIG. 2B.

In FIG. 2D an integrated circuit 500 supports WCDMA (wideband code division multiple access) RF (radio frequency) in a receiver section 510 and a transmitter section 550. The cellular telephone antenna of the cellular telephone handset 110 couples to a switch unit 570 that in turn couples to the GSM circuits of FIG. 2C and the CDMA circuits of FIG. 2D. The receiver output lines at upper left and transmitter input lines at lower left are all coupled to the WCDMA/HSDPA baseband block 315 in FIG. 2B.

Figure 2E:
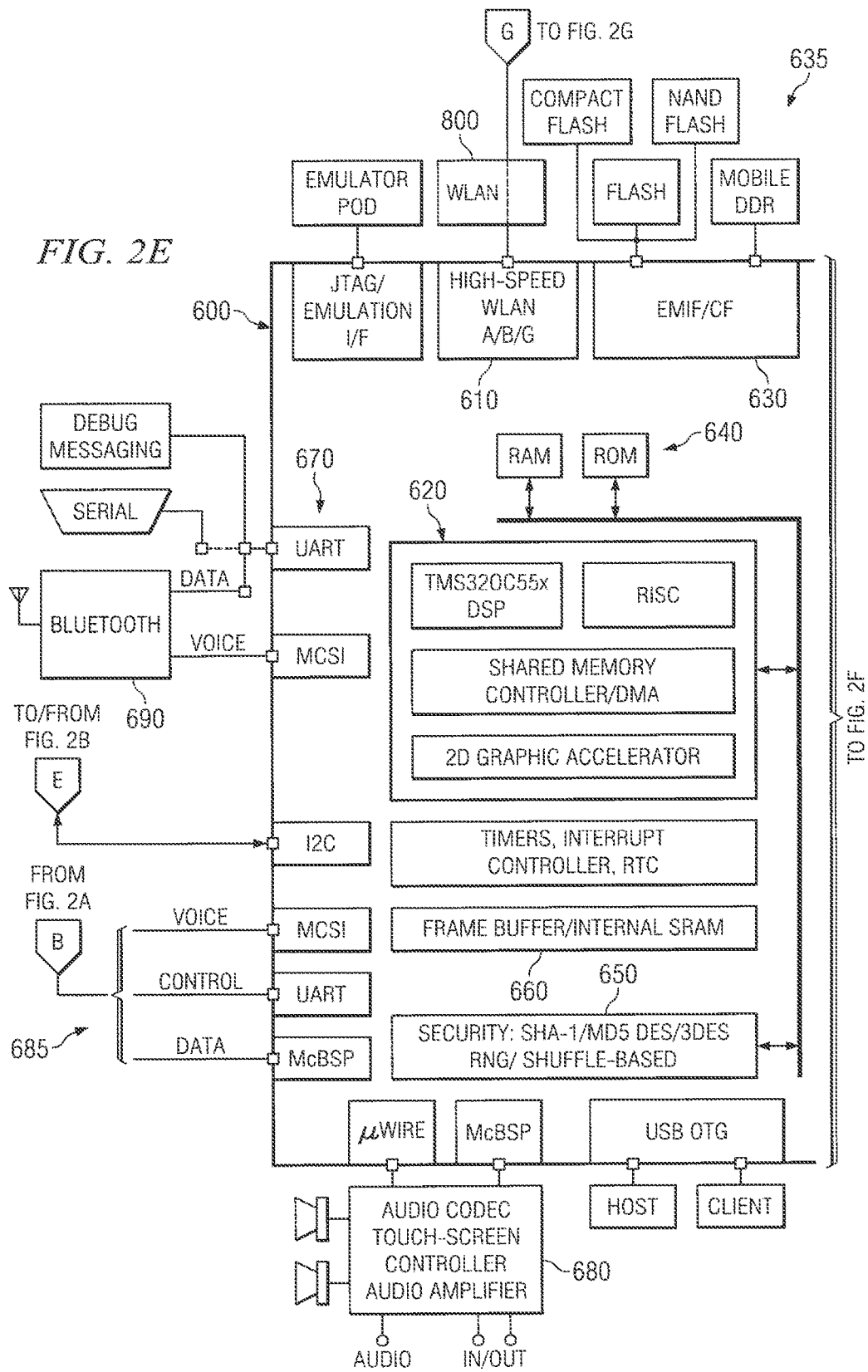

In FIGS. 2E and 2F are illustrated two halves of the block diagram of an integrated circuit chip 600 for application processing and various off-chip peripherals.

Beginning with FIG. 2E, on-chip are found a high-speed WLAN 802.11a/b/g interface circuit 610 coupled to a WLAN chip 800 of FIG. 2G.

Further provided on chip 600 of FIG. 2E is an applications processing section 620 which includes a RISC processor (such as MIPS core, ARM processor, or other suitable processor), a digital signal processor (DSP) such as a TMS320C55x DSP from Texas Instruments Incorporated or other digital signal processor, and a shared memory controller with DMA (direct memory access), and a 2D (two-dimensional display) graphic accelerator. The RISC and the DSP have access via on-chip extended memory interface (EMIF/CF) 630 to off-chip memory resources 635 including as appropriate, mobile DDR (double data rate) DRAM, and flash memory of any of NAND Flash, NOR Flash, and Compact Flash. On-chip, the shared memory controller in circuitry 620 interfaces the RISC and the DSP via on-chip bus to on-chip memory 640 with RAM and ROM. The 2D graphic accelerator is coupled to frame buffer internal SRAM (static random access memory) 660.

Further in FIG. 2E, security block 650 includes secure hardware accelerators having security features and provided for accelerating encryption and decryption of any one or more types known in the art. A random number generator RNG is provided in security block 650. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARCO (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software.

Improvements are suitably implemented as described especially in connection with integrated circuit 122 of FIG. 1 and elsewhere herein as related to FIG. 2E processing section 620, security block 650, RAM and ROM 640, and EMIF/CF block 630

Further in FIG. 2E, on-chip peripherals 670 include UART data interface and MCSI (Multi-Channel Serial Interface) voice interface for off-chip Bluetooth short distance wireless circuit 690. Debug messaging and serial interfacing are also available through the UART. A JTAG emulation interface couples to an off-chip emulator for test and debug.

Further in peripherals 670 are an I2C interface to analog baseband ABB chip 300 of FIG. 2B, and an interface 685 to applications interface 275 of integrated circuit chip 200 having digital baseband DBB in FIG. 2A. Interface 685 includes a MCSI voice interface, a UART interface for controls, and a multi-channel buffered serial port (McBSP) for data. Timers, interrupt controller, and RTC (real time clock) circuitry are provided in chip 600.

Further in peripherals 670 are a MicroWire (u-wire 4 channel serial port) and multi-channel buffered serial port (McBSP) to off-chip Audio codec, a touch-screen controller, and audio amplifier 680 to stereo speakers. External audio content and touch screen (in/out) are suitably provided. Additionally, an on-chip USB OTG interface couples to off-chip Host and Client devices. These USB communications are suitably directed outside handset 110 such as to PC 190 (personal computer) and/or from PC 190 to update the handset 110.

Turning to FIG. 2F, chip 600 includes further interfaces and features. Note that the block diagram of FIGS. 2E and 2F is understood as providing on-chip peripheral bussing and couplings between the application processing circuitry 620 and the various on-chip peripheral blocks, regardless of whether the diagram lacks explicitly-shown busses and couplings, as is understood by the skilled worker.

An on-chip UART/IrDA (infrared data) interface 710 couples to off-chip GPS (global positioning system) and Fast IrDA infrared communications device. An interface 720 provides EMT9 and Camera interfacing to one or more off-chip still cameras or video cameras 730, and/or to a CMOS sensor of radiant energy, and/or to a debugger.

Further in FIG. 2F, an on-chip LCD controller and associated PWL (Pulse-Width Light) block 740 are coupled to a color LCD display and its LCD light controller off-chip. Further, on-chip interfaces 750 are respectively provided for off-chip keypad and GPIO 760, on-chip LPG (LED Pulse Generator) and PWT (Pulse-Width Tone) interfaces are respectively provided for off-chip LED and buzzer peripherals 770. GPIO 760 has several chip pins for inputs, and pin gpio_13 is discussed in connection with FIG. 4B, for instance.

On-chip MMC/SD multimedia and flash interfaces are provided for off-chip MMC Flash card, SD flash card and SDIO peripherals 780. An on-chip selectable-mode HDQ or 1-Wire (hardware protocols) battery monitoring serial interface module is provided for monitoring the off-chip Battery. On-chip Clock and Reset management circuitry 790 (relating to POR 142 of FIG. 1) is connected to off-chip 12 MHz and 32 KHz crystals and to a reset pushbutton switch 795.

In FIG. 2G, a WLAN integrated circuit 800 includes MAC (media access controller) 810, PHY (physical layer) 820 and AFE (analog front end) 830. PHY 820 includes blocks for BARKER coding, CCK, and OFDM. PHY 820 receives PHY Clocks from a clock generation block supplied with suitable off-chip host clock, such as at 13, 16.8, 19.2, 26, or 38.4 MHz. These clocks are often found in cell phone systems and the host application is suitably a cell phone or any other end-application.

AFE 830 is coupled by receive (Rx), transmit (Tx) and CONTROL lines to an off-chip WLAN RF circuitry 840. WLAN RF 840 includes a 2.4 GHz (and/or 5 GHz) direct conversion transceiver and power amplifier and has low noise amplifier LNA in the receive path. Bandpass filtering couples WLAN RF 840 to a WLAN antenna.

In MAC 810, Security circuitry 850 supports any one or more of various encryption/decryption processes such as WEP (Wired Equivalent Privacy), RC4, TKIP, CKIP, WPA, AES (advanced encryption standard), 802.11i and others.

For WLAN, the security circuitry and processes depicted in FIGS. 1, 3, 4A, 4B and 4C are suitably provided for security block 850 and processor 860 of FIG. 2G.

Further in FIG. 2G, processor 860 comprised of an embedded CPU (central processing unit) is connected to internal RAM and ROM and coupled to provide QoS (Quality of Service) IEEE 802.11e operations WME, WSM, and PCF (packet control function). Security block 850 in FIG. 2G has busing for data in, data out, and controls interconnected with CPU 860. Interface hardware 870 and internal RAM on-chip couples CPU 860 with (see FIG. 2E) interface 610 of applications processor integrated circuit 600 of FIG. 2E.

The description herein next turns to a review of some of the considerations noted above and provides further detailed description.

A problem arises where a first processor has fewer features and a second processor has additional operational features plus security features. This will require all customers who want the additional operational features to use the security features of the second processor device, whether they want security or not.

For such customers, they may not even be able to boot the second processor device without using the security if there is a secure boot feature that has a header on any boot code for the device. This boot code header adds unwanted complexity, the need for more tools (signing tools), takes up memory space, and makes some solutions unusable.

To solve this problem, "Dummy" devices are provided with an E-fuse bit within the processor device to disable the security functions. By disabling the security functions, the solutions proposed:

Allow customers who are not interested in security functions to use the other features of the device without being hassled with the overhead of security requirements for boot.

Allow these customers to still use the peripheral bootloader features by bypassing security checks within the boot-ROM.

Allow the manufacturer to recover yield loss for any devices which have silicon fallout within the security modules by burning the fuse to make them Dummy devices.

A GP (general purpose non-secure) device starts as a HS (high security process) device, with a different E-Fuse setting and the on-chip ROM code enables the necessary transition to a GP Device. Before describing the operation of a GP device, the two boot modes supported for GP devices are as follows:

GP Full Boot:
　The device boots without authentication for both Memory Booting and Peripheral Booting
　The boot sequence is as follows:
　　The device starts at CS0 (on-chip ROM)
　　Secure mode entry is disabled
　　Unauthenticated Memory Booting and Peripheral Booting are executed. All the ROM code authentication is skipped.
GP Fast Boot:
　GP Fast boot is selected by an external pin.
　The boot sequence is as follows
　　The device starts at CS0 (on-chip ROM)
　　Secure mode entry is disabled
　　The ROM code Peripheral Booting and Memory Booting mechanisms are skipped and the device executes "trampoline code" (self copying code present in Internal Test RAM) which makes it directly jump to CS3 (External Flash Memory)
　　Interrupts are disabled and ARM processor core is in Supervisor mode.

As shown in FIG. 1, the on-chip boot ROM 132 reads the Production ID E-Fuse. Two bits of the Production ID E-Fuse determine if the device is a GP device. device is a GP device, do the following:

Power-On Reset
　On a power-on reset (PURX), enter secure mode and perform a Secure-to-GP conversion.
　The Secure-to-GP conversion is as follows:
　　Secure watchdog timer is disabled.
　　Hardware accelerators are made accessible in non-secure mode.
　　The device is set to use public debug
　　Check if GP Fast boot is enabled through the use of a GPIO (GPIO_13, low is GP Fast boot, high is GP Full boot)
　　Set a Test RAM variable which determines the type which boot type is used (GP Full boot or GP Fast boot). For GP Fast Boot trampoline code is copied from the ROM to Test RAM.
　　Exit secure mode
　　Check the Test RAM variable to determine the booting mechanism (GP Full boot or GP Fast boot) and perform the appropriate booting mechanism
Non Power-On reset
　Check the E-fuse bits to confirm device type.
　If GP device, check the Test RAM variable to determine the booting mechanism (GP Full boot or GP Fast boot) and perform the appropriate booting mechanism.

Advantageously, the developer or manufacturer may create only a single ROM code release and thereby enable customers who desire either high security or general purpose devices. In this fast, efficient solution, simple ROM code changes allow the device to function as a GP device or an HS device (based on whether E-fuse bits are burned or not). By burning certain E-fuse Bits in a first embodiment, the GP device can be converted to an HS device. In a second embodiment, burning certain E-fuse bits converts an HS device into a GP device. In a third embodiment, E-fuse bits are burned selectively to produce either an HS device or a GP device with various selections (or not) of features.

1. Introduction
　GP (General Purpose) device is a production device that offers other capabilities in the boot code which enable the user to boot and flash without authentication and run-time security environment. Boot code for GP device consists in an enhancement of the boot code that is used for a High Security device.
　GP device is different from a High Security device because Production ID bits [30:31] of an addressable register (PRODUCTION_ID_REG0) are set differently for a GP device as compared to an HS device.
　"CS" followed by a numeral refers to a Chip Select signal to an enumerated part of system memory on chip or off chip. CSx signals to the different enumerated memory parts are used to fetch different blocks of code or data.

2. GP Device Features of OMAP 161x GP Device
　Booting/Flashing
　　Authentication during booting and flashing is skipped.
　　NOR booting from CS3 without certificates or TOC (Table of Contents)
　　Support for a NOR TOC address offset at 0x200 (in reset mode 0 only)
　　NAND Flash booting with TOC but no certificates.
　Debug Capabilities
　　The device is enabled in the Public Debug mode.
　Watchdog
　　The secure watchdog is disabled
　Hardware Accelerators (HWAs)
　　HWA support is available in User Mode.
　Flashing (NOR/NAND)
　　Unauthenticated flashing is supported
　Security
　　Secure ROM
　References to "2ND" mean a Flash Loader software in the apparatus (such as a wireless handset). The Flash Loader loads software external to the apparatus via a serial interface (e.g., SSI, UART, or USB) into a flash memory in the apparatus.
　"PPA" means a Primary Protected Application which operates at boot time
　References to "X Loader" mean bootstrap code that loads the rest of the code into Flash memory.

3. Top-Level Description
　GP device allows two new different ways of booting/flashing in the boot code:
　GP Full Boot:
　　The device boots without authentication for booting, and without authentication for flashing.
　　Run-time security is disabled (secure mode entry is disabled).
　GP Fast Boot:
　　The device boots skipping the main boot code process that consists in booting (memories detection) and flashing (interfaces polling), and jumps directly to CS3. The user avoids fetching code at location that corresponds to a predetermined memory space reserved for secure entry sequence code because the secure state machine monitors this predetermined memory space even on CS3.
　　Run-time security is disabled (secure mode entry is disabled).
　　Interrupts are disabled and the ARM processor core in the device is in Supervisor mode.
　　GP Fast Boot is selected by an external pin.
　　At power-on reset only, a Secure-to-GP conversion is performed for both GP Full Boot and GP Fast Boot.
　　The secure-to-GP conversion is as follows:
　　　Secure watchdog timer is disabled.
　　　Hardware accelerators can be accessed in non-secure mode.
　　　The device is set to use public debug.

On a GP device, the boot code reads Production ID bits [30:31] and based on that information, normal boot (secure boot) process is disabled.

However in case of a non-power-on reset, the boot code still checks Production ID bits [30:31] to ensure that the device is a GP device, but reads also a variable in testSRAM that contains the information to perform a GP Full Boot or a GP Fast Boot.

Figure 3:
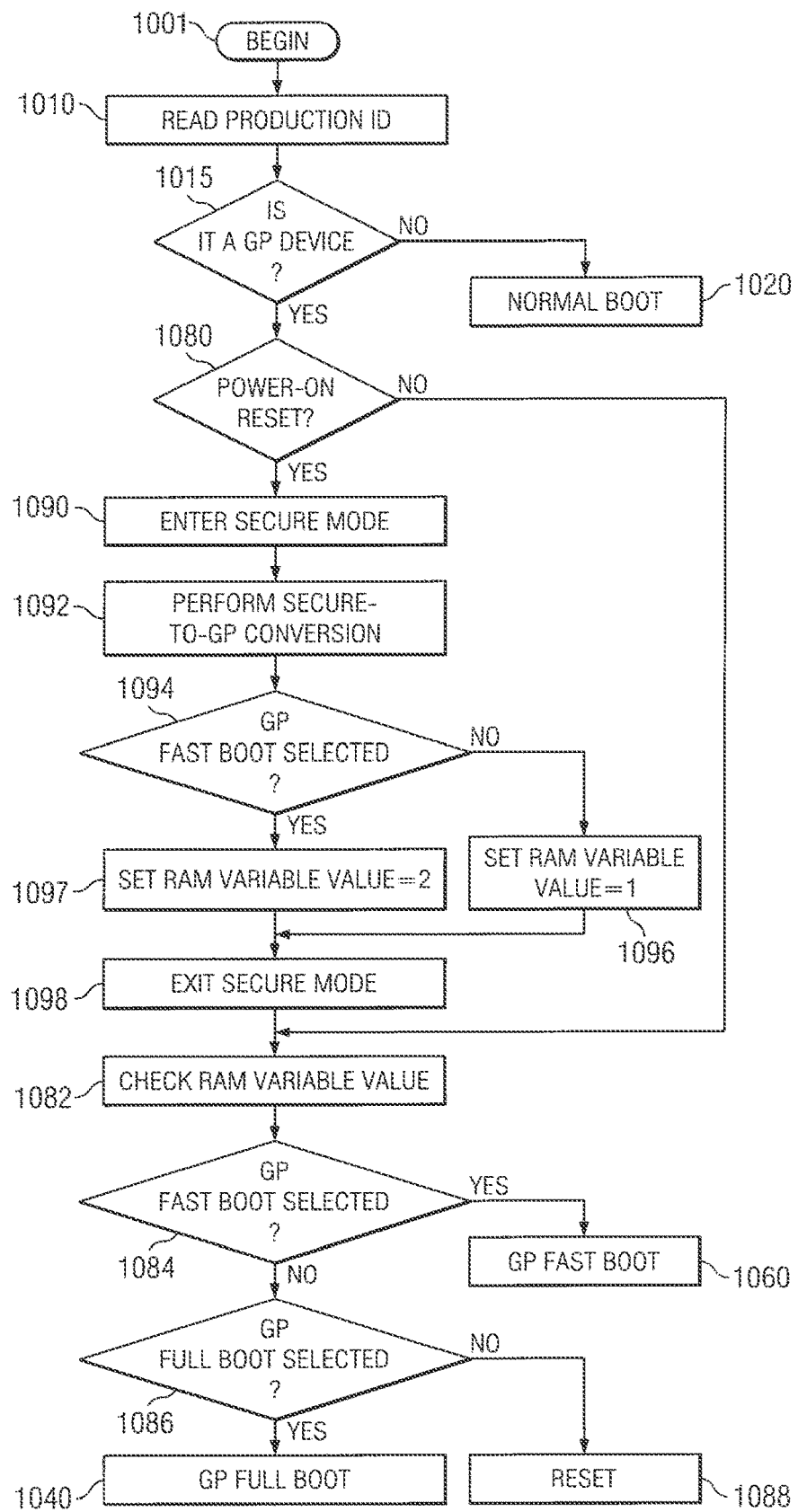
FIG. 3 is a flow diagram of a process of selectively operating a communications system for high security (HS) or general purpose (GP) use, such as established by ROM code on an integrated circuit in one or more of the system blocks of FIG. 1.

The flowchart of FIG. 3 describes the process flow of a GP device.

4. Implementation Details
4.1 Overview

In case of a GP Fast Boot, the boot code uses an area in testSRAM to copy a trampoline code from the boot ROM. This trampoline code sets the Boot Mode (BM) bit of an addressable EMIFS_CONFIG register in order to swap CS3 and CS0 mapping and jumps at address 0x00000000 (once the mapping is changed, this address is in CS3). GP Fast Boot is selected by setting GPIO_13 pin to 0 which is the default value in reset mode 0 but not in reset mode 1. For both GP Full Boot and GP Fast Boot, a variable (gp_device_type) is defined in testSRAM. This variable, as well as the trampoline code, needs to be preserved when the boot code comes up after a non-power-on reset. This variable reflects the selected boot:

gp_device_type=0: this case can be normally considered as valid for a Production device but not for a GP device
gp_device_type=1: GP Full Boot selected
gp_device_type=2: GP Fast Boot selected GP device implementation can be split in two parts: one for public side and one for secure side.

For public side, GP device performs the following:
For GP Full Boot
    Use a NOR TOC address offset of 0x200 in reset mode 0
    Set to 0 ASIC_ID fields related to security
    Skip authentication for booting and flashing
    Create a new function to call Xloader/2nd boot code
For GP Fast Boot
    Branch to trampoline code in testSRAM
    Configure EMIFS CS3 to use read mode 0
For both boots
    Read Production ID bits [30:31]
    Enter secure mode
    Check gp_device_type variable
    Check for reset type (power-on reset or non-power-on reset)
    Disable instruction cache and invalidate it
For secure side, GP device performs the following:
For both boots
    Create a function that checks secure mode entry related to GP device among other secure mode entries
    Set gp_device_type variable
    Perform secure-to-GP conversion
    Check GPIO_13 pin value
For GP Full Boot
    No specific action
For GP Fast Boot
    Copy trampoline code to testSRAM Important Note:
Test at-speed capabilities can be used on a GP device. Like High Security devices, test at-speed is available only on a power-on reset. For a GP device, if test at-speed is enabled, gp_device_type variable is set to 0, so that after a non-power-on reset, the device performs a software reset to avoid the execution of the test at-speed part.

Figure 4A:
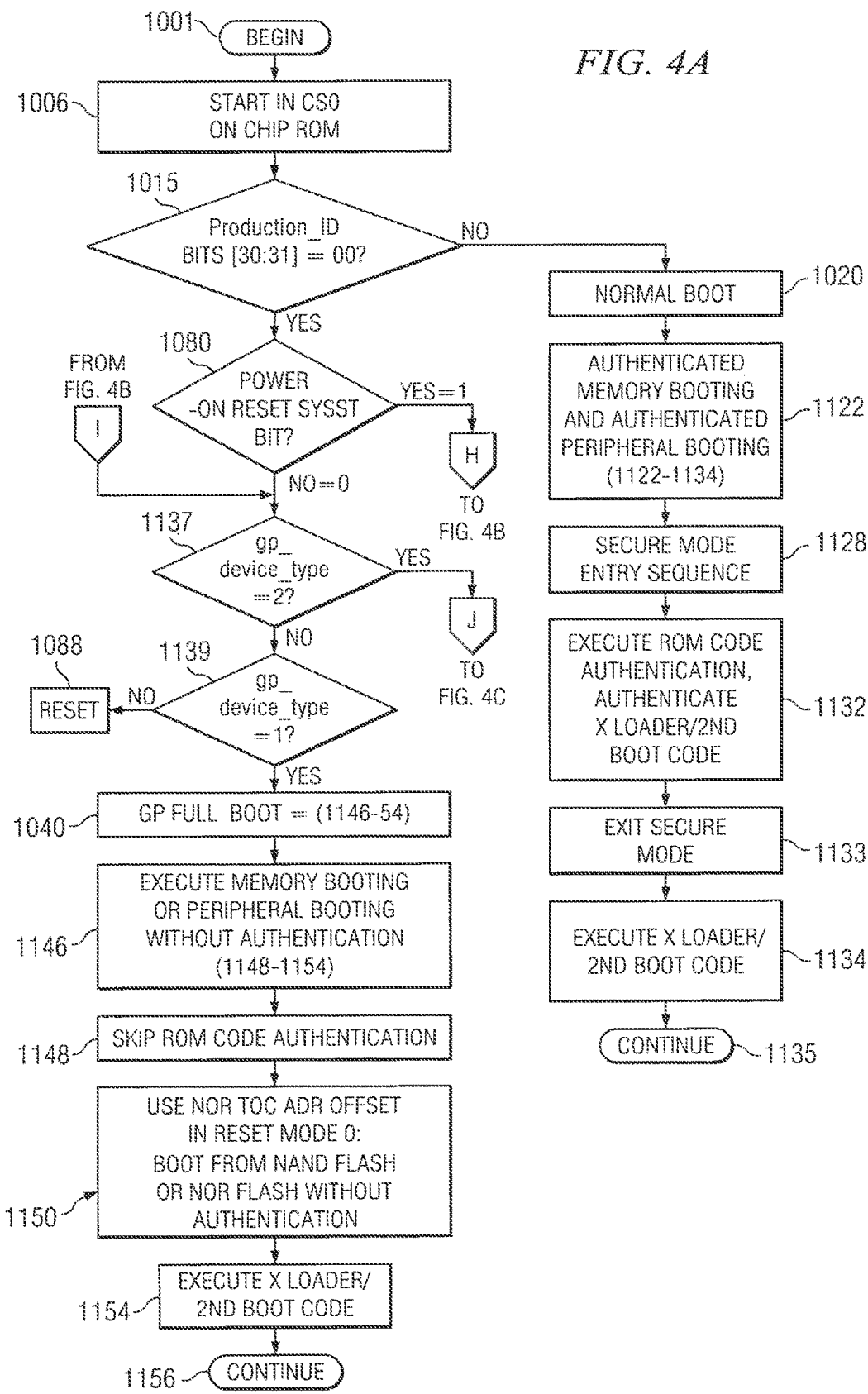
FIGS. 4A, 4B, and 4C together constitute a more detailed flow diagram of a process of selectively operating a communications system for high security (HS) or general purpose (GP) use, such as established by ROM code on an integrated circuit in one or more of the system blocks of FIG. 1.
Figure 4B:
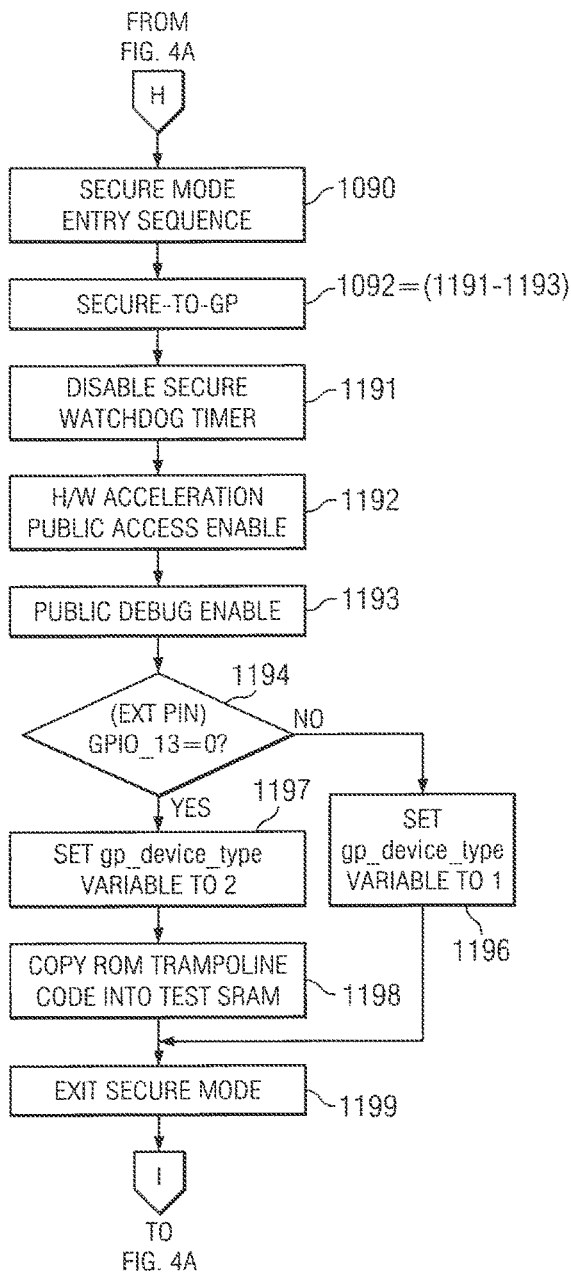
Figure 4C:
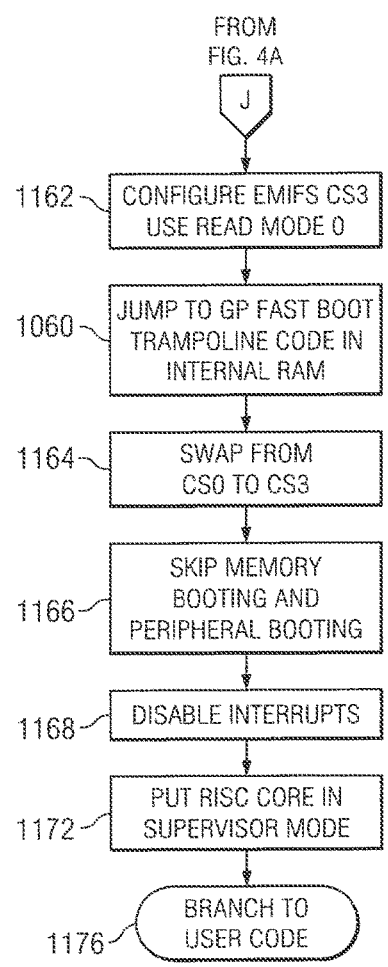

The flowchart of FIGS. 4A, 4B, 4C describes in detail GP device process flow.

4.2 Read Reset Type

First GP Full Boot checks the reset type by reading an addressable ARM_SYSST register for ARM system status. Power or reset indication is given by bit 5=1.

| ARM_SYSST register | | |
|---|---|---|
| Bits | Function | Comments |
| 5 | 0: No power-on-reset has been detected<br>1: Power-on-reset has occurred | Indicates whether or not power-on reset has occurred. |

4.3 Enter Secure Mode

GP device reuses the secure mode entry sequence of High Security device. A secure mode entry request especially for GP device is created and is different from other secure mode entry requests (e.g.: secure initialization, return from interrupt, secure remote call).

At power-on reset, when GP device enters secure mode to perform a secure-to-GP conversion, the secure mode is not initialized.

4.4 Set the Global Variable gp_device_type variable needs to be preserved after a software reset, so it is stored as one byte in testSRAM since this memory survives a non-power-on reset. It will be the responsibility of the user not to overwrite this variable. The user preferably preserves sufficient bytes of boundary area starting from the top address of the testSRAM.

This memory area is big enough since only one byte is required for the global variable, but the same location will be used also for trampoline code of GP Fast Boot.

Here are the different values for gp_device_type variable:
gp_device_type=0: this case can be normally considered as valid for a High Security device but not for a GP device
gp_device_type=1: GP Full Boot selected gp_device_type=2: GP Fast Boot selected 4.5 Secure-to-GP Conversion The ROM code performs the following steps at power-on reset:

Public access (user mode access) is granted to the security HW accelerators.

The secure watchdog timer is disabled.

Debug capability is set for "Public Debug" (JTAG, ETM, ICE bits of the security control register SECCTRL are set to 1, EMU Bit is 0).

Secure-to-GP conversion is performed by writing into the addressable secure control register (SECCTRL).

| SECCTRL register | | | |
|---|---|---|---|
| Bits | Name | Function | Value to write |
| 0 | CONF_WD_ACC_R | Secure watchdog register update access control register.<br>1: Watchdog register is frozen<br>0: Watchdog register is running | 0x1 |

-continued

SECCTRL register

| Bits | Name | Function | Value to write |
|---|---|---|---|
| 1 | CONF_WDA_EN_R | Secure watchdog operation enable control register. 1: Watchdog operation enabled 0: Watchdog operation disabled | 0x1 |
| 2 | CONF_ICE_EN_R | MCU emulation enable control register. 1: MCU debug is not affected 0: MCU debug disabled | 0x1 |
| 5 | CONF_ETM_EN_R | ETM enable control register. 1: Trace is not affected 0: Trace is disabled | 0x1 |
| 6 | CONF_JTAG_EN_R | MPU JTAG enable control register. 1: MPU JTAG is enabled 0: MPU JTAG is disabled | 0x1 |
| 7 | NORMAL_EMU_MODE_R | Security condition register. 0: security type is normal secure 1: security type is debug secure | 0x0 |
| 8 | CONF_SHA_EN_R | SHA-1 module access control register. 0: SHA-1 module access in non-secure mode and secure mode is enabled 1: SHA-1 module access in secure mode only is enabled | 0x0 |
| 9 | CONF_MUX_CTRL_R | 0: The registers FUNC_MUX_CTRL (3-12), PULL_DWN_CTRL (0-4), and PU_PD_SEL (0-4) are accessible at anytime. 1: The registers FUNC_MUX_CTRL (3-12), PULL_DWN_CTRL (0-4), PU_PD_SEL (0-4) are accessible only while the device is in secure mode. | 0x0 and |
| 10 | CONF_DES_EN_R | DES/3DES module access control register. 0: DES/3DES module access in non-secure mode and secure mode is enabled. 1: DES/3DES module access in secure mode only is enabled. | 0x0 |
| 11 | CONF_RNG_EN_R | RNG module access control register. 0: RNG module access in non-secure mode and secure mode is enabled. 1: RNG module access in secure mode only is enabled. | 0x0 |
| 12 | CONF_SECCTRL_WR_DIS | Lock write access to OTP (one time programmable) bits. 0: no lock 1: lock in GP mode | 1 |
| 31:13 | Reserved | N/A | 0x0000 |

Once secure-to-GP conversion is performed by a mask write to SECCTRL register of bits as shown, the user cannot re-enter secure mode anymore since ICE, ETM and JTAG are enabled.

4.6 ARM Caches

For both GP Full Boot and GP Fast Boot, instruction cache is disabled before branching to external code. Since the boot code enables it at the very beginning of the execution flow, instruction cache is also invalidated so that the ARM does not fetch eventual boot ROM instructions previously stored in cache (especially for GP Fast Boot). Neither data cache, nor MMU (Memory Management Unit) are enabled by the boot code. Then, just before branching to external code, instruction cache is:

disabled (bit 12 of cp15 control register is set to 0)
invalidated (cp15 c7, c5 registers are written with 0)

4.7 GP Full Boot 4.7.1 Authentication Skipping

As secure functions, used by High Security device boot code, are called in a sequential manner, 'if/else' structures are implemented to skip boot image or flash image authentication parts, based on gp_device_type variable value.

4.7.2 Secure ASIC_ID Fields

In general, this register pertains to identification of the processor device itself (no external ASIC is meant here). Since GP Full Boot does not initialize secure mode variables nor re-enters secure mode after the secure-to-GP conversion, the boot code sets to 0 security related fields of ASIC_ID (in bold in the table below).

| Field | Description |
|---|---|
| Data | Read from structure that is filled during the secure ROM initialization. |
| Data | The bytes of Public ID are generated by secure ROM. The public ID is read by doing formal security entry/exit. |
| Data | Bytes of Root Hash are generated by secure ROM. The Root Hash is read by doing formal security entry/exit. |
| Secure Csum | CRC bytes of the secure ROM. |

4.7.3 Jump to Xloader/$2^{nd}$ Boot Code

The GP device boot code needs to set up a function to call Xloader/2nct boot code embedded in a booting/flashing image. This function replaces the function used for High Security device to authenticate and execute Xloader/2nct boot code.

This function passes the same parameters to the Xloader/$2^{nd}$ boot code and jumps to this code in ARM mode as the HS function does.

4.8 GP Fast Boot

Like GP Full Boot, the boot code checks the reset type (see section 4.2) and goes into secure mode (see section 4.3) at power-on reset.

GP Fast Boot is selected when GPIO_13 pin is 0 at power-on reset or when gp_device_type variable is 2 at non-power-on reset.

4.8.1 Check GPIO_13 Pin

First, the boot code enables clock for General Purpose Input Output pin (GPIO) by writing into addressable Clock Control (CAM_CLK_CTRL) register.

| CAM_CLK_CTRL register | | |
|---|---|---|
| Bits | Function | Value to write |
| 15:3 | Unused | 0x00 |
| 2 | Clock enable of the po_clk_system_clk output clock of ULPD. 0: clock disabled. 1: clock enabled. | 0x1 |
| 1 | When 0 the cam_clk is the system clock. When 1 the cam_clk is the System_clock/2. | 0x0 |
| 0 | Enable of the cam_ clk: When 0 the cam_clk is off. When 1 the cam_clk is on. | 0x0 |

As GPIO_13 pin is configured by default as an input for both reset modes, then the boot code directly reads GPIO_13 pin value by reading bit 13 of addressable GPIO1_DATAIN register.

| GPIO1_DATAIN register | | |
|---|---|---|
| Bits | Function | Comments |
| 31:16 | Reserved | |
| 15:0 | This field contains the received data at the GPIO input port. | The boot code reads bit 13 |

If bit 13 of GPIO1_DATAIN register is 0, then GPIO_13 pin is 0 and GP Fast Boot is selected.

4.8.2 Configure the EMIFS (Extended Memory Interface Slow)

EMIFS configures accesses to external off-chip memory. For GP Full Boot, the EMIFS is configured automatically by the boot code but for GP Fast Boot, call the function (already existing in the boot code) that will do the same EMIFS configuration.

5. GP Device Booting/Flashing Images

This section concerns only GP Full Boot, for GP Fast Boot no special image format is required.

The user builds non-signed booting/flashing images. The image format is as follows:

| | Bytes | Size | Fields |
|---|---|---|---|
| TOC item for Xloader/$2^{nd}$ boot | 0:3 | 4 bytes | Xloader/$2^{nd}$ boot code address offset from the TOC |
| | 4:7 | 4 bytes | Xloader/$2^{nd}$ boot size |
| | 8:19 | 12 bytes | 0x0 |
| | 20:31 | 12 bytes | String "X-LOADER" or "2ND" |
| Dummy TOC item for TOC end Xloaer/$2^{nd}$ boot code | 0:31 | 32 bytes | 0xF |

This image format is valid for booting from a NOR or NAND flash memory and for flashing ($2^{nd}$ boot).

If booted from a NOR:

in reset mode 0, this image is located at an address (offset by a predetermined amount in CS3)

in reset mode 1, this image is located at EMIFS CS1-CS3 top address+an offset.

If booted from a NAND, the Table of Contents (TOC) detection is similar to High Security device boot code, that is to say:

in reset mode 0:

if using a NAND on EMIFS (if EMIFS bus is not multiplexed), this image is located at the beginning of the first page and Xloader/$2^{nd}$ boot code is placed in the first block of the NAND flash (CS3 only).

if using a NAND on the NAND Flash Controller (if EMIFS bus is multiplexed), this image can be located anywhere within the NAND flash (CS0-CS3).

Reset mode 1 supports the NAND Flash Controller only and this image can be located anywhere within the NAND flash (CS0-CS3).

E-Fuse Settings and Secure ROM Changes for GP Device

In some embodiments, GP devices are advantageously constructed the same as HS production devices except for the differing E-fuse values on the device. The secure ROM code on the device uses the E-fuse value for Production ID[30:31] to determine if the device is a GP or HS Device. These and other E-fuse settings of GP and HS devices, and a production procedure, are described.

An example of GP Device not only includes the Production ID[30:31] bits but in some cases also the following particular E-Fuse 140 bits and settings. A NORMAL bit-pair and EMULATOR bit-pair (together, 4 bits) are set to default values for a Normal/Production device (synonymous with higher-security (HS) device). (The EMULATOR bits in E-Fuses 140 are not to be confused with the EMU bit of the Security Control SECCTRL register referred to elsewhere herein.) In the HS device, debug support is disabled by default at power-up because debug is disabled at the RISC processor core boundary under control of ICE bit in SEC-CTRL, and the JTAG state machine is forced into reset under control of JTAG bit in SECCTRL. An external host is prevented from taking control of both RISC and DSP code execution through the JTAG interface. SECCTRL is only accessible in secure mode. JTAG does not read the NOR-MAL bit-pair and EMULATOR bit-pair unless JTAG is enabled.

The EMULATOR bit pair is suitable for manufacturer's internal use if set for debug of HS devices but not suitable for distribution as a product to users if set for such debug. By contrast, the provision of the HS/GP Production ID [30:31] bits enabling the other improvements added and described in this detailed description, remarkably and advantageously does establish suitability for distribution as selectively-determined higher-security/lower-security products to users. In both the higher-security and lower-security types of such products, in this example, the NORMAL bit-pair and EMULATOR bit-pair (together, 4 bits) are given their default values wherein NORMAL bit-pair and EMU-LATOR bit-pair are set for higher-security device and product use. Then the Production ID [30:31] bits when set to signify a GP device, suitably establish the lower-security device suitable for products. Advantageously, the Production ID [30:31] bits are provided and coupled to the logic 138 to establish the GP or HS device those Production ID[30:31] bits represent, while the NORMAL and EMU-LATOR bits suitably retain their functionality unchanged for at least the HS device.

Among further advantages, the Production ID[30:31] bits are suitably unprotected by the security monitoring circuitry and these bits [30:31] are accessible and readable outside of secure mode. This is because when these bits [30:31] signify the lower-security (GP) device, a GP boot does not necessarily use secure mode. Manufacturer's Public Key MPK may not need to be accessed and should be protected. For instance, a GP boot on warm reset does not use secure mode, while a GP boot on power-on hardware reset does use secure mode. Thus, the Production ID[30:31] bits are advantageously openly accessible whether or not secure mode is entered. This is true regardless of the condition as warm reset and hardware reset. By contrast, MPK and other such special-purpose bits remain protected from access when entry into secure mode is unnecessary. Outside of secure mode, software thus checks bits [30:31] and in the GP case determines which reset is occurring, and only then branches to code that accesses secure mode in the case of hardware reset where entry into secure mode is involved.

Further in the E-Fuses 140 of FIG. 1, the Device Key is given a multibit value, which represents a random symmetric key and is unique per device. The multibit Manufacturer's Public Key (MPK), is not burned and is left to a default value. These MPK bits are also called the GP Identifier (GPI) bits because they are suitably accessible by the ROM code in secure mode, and not accessible outside of secure mode, to double-check and determine if the device is a GP device by comparison of the HS or GP type determinable from the MPK (default value or not) with the HS or GP type represented by the Production ID[30:31] bits. If the comparison does not match, the device is reset. The Customer Key is also not burned and is left at a default value.

In one embodiment of the manufacturing process, the E-fuse is burned in two stages:
1) Burning at Probe—on both HS devices and GP devices, the NORMAL bits and EMULATOR bits, and the Device Key are suitably burned at probe. Leave Production ID[30:31] bits unaltered or unburnt.
2) Burning at Test—on each HS device, the MPK and the Customer Key are suitably burned at test. Burn Production ID[30:31] only for the devices that are to be HS devices. On a GP device, the Production ID[30:31] bits are not burned, and the MPK and the Customer Key are also not burned on a GP device.

Hence, in the case of a GP Device, the E-fuse settings have the following advantages as far as manufacturing is concerned. The manufacturing step of burning the MPK and the customer key are skipped on GP devices. These values are by default set to their default value(s). The manufacturing flow for a Normal/Production device and a GP device are very similar, but for the final phase (burning at test). Hence the devices are differentiated only at that step. This confers inventory flexibility. Yield loss is reduced for GP devices when the embodiment does not burn a value at test.

In an example, the high-level ROM code flow has these steps:
1. The GP device starts as if it were a HS production device
2. A function call is made from the public ROM into the Secure ROM
3. The Secure ROM function reads the MPK bits and sees if they are at default value or not.
4. If the MPK bits are at default value, a Public ROM variable is set to indicate the device type as "GP" and the following steps are taken inside secure mode by setting the bits of the Security Control Register (SECCTRL)
   a. Public access (User Mode access) is granted to the security HW accelerators.
   b. The Secure Watchdog timer is disabled by turning off the watchdog bit in the SECCTRL register. Otherwise, to grant either read or write access to an OCP (Open Core Protocol) secure-watchdog-protected register, secure mode is enabled and the watchdog bit would be set in the SECCTRL security control register. In secure mode, a watchdog counter times-out after a period of time. The code, when used in an authorized manner, re-enters secure mode to reload the counter to avoid a reset.
   c. Debug capability is set for "Public Debug" (JTAG, ETM, ICE bits of the security control register SECCTRL are set to 1, EMU Bit is 0).
5. Control is handed over to the public ROM, where further processing occurs. Access to secure ROM is denied, to prevent compromise of secure code.

An advantage of using the MPK bits is the reduction of overhead in the secure ROM as there are function calls which directly read the MPK bits.

Advantages of GP devices include:
i. Support for NOR booting with no certificates (security headers) to obviate managing private keys and signing certificates. NOR boots with or without TOC. No change to NOR boot image is needed. The ROM code detects whether there is a Table of Contents (TOC). The TOC is a simple multiple-byte item, which does not add any significant overhead to the flashing/booting process. An image is readily reformatted to include a TOC. NOR Boot occurs from NOR flash on CS3. The X-Loader code (or bootloader) is located at a predetermined address on CS3. The GP device does not directly boot from CS3, it suitably starts from CS0 and immediately jumps to CS3. Delay (e.g., a fraction of a second) for flashing on a power-on reset is acceptable because it is infrequent.
ii. Support for booting also accommodates NAND flash memories and is especially advantageous when they are cheaper and/or have higher density of storage than NOR flash. Booting from NAND flash is initiated on CS0 by the ROM code, and the boot image first is copied to Internal RAM. The boot image contains a small, minimal TOC structure (multiple bytes as desired). NAND boot suitably occurs without certificates (security related headers) in the NAND boot image. Managing private keys and signing certificates are obviated.
iii. Hardware accelerators (HWA) support in User Mode. User-Mode access to hardware accelerators improves performance for various cryptographic operations at run-time, without any complex boot security mechanisms and hence is an attractive option.
iv. GP devices are no compromise to security of HS devices. For instance, GP devices disable access to the HS ROM code as discussed in detail herein.
v. Support for NOR/NAND flashing (interfaces polling through SSI, UART, USB) from internal ROM code. The flashloader ("$2^{ND}$") is downloaded through the interface, to include a TOC. GP devices can thus download images with a minimal TOC structure (multiple bytes) using the functionality provided in the ROM code.

The GP functionality is provided by the ROM code without need of hardware changes. The ROM boot code does the following in a sequential manner at Power-On Reset:
Enter Secure Mode once
Read E-fuse value to see if the device type is a GP device.
If it is GP, the following are done:
All Boot-time authentication is skipped in steps 1146 and 1148 of FIG. 4A or is not needed in step 1166 of FIG. 4C.

Public access (User Mode access) is granted to the security HW accelerators in step 1192.

The Secure Watchdog timer is disabled by writing to SECCTRL register in step 1191. If done at the beginning while checking the E-Fuses, this is relatively economical of ROM code. If done just before giving the handoff to the external code (e.g. flash loader or X-loader), somewhat more ROM code is likely to be used.

Debug capability is set in step 1193 for "Public Debug" (JTAG, ETM, ICE bits of the security control register SECCTRL are set to 1, EMU Bit is 0). Since Public Debug limits debug access only to public spaces, a security advantage is obtained.

Run-time security is disabled in step 1199.

In addition or alternatively, GP devices suitably operate on the device type bits as follows: At Power-On Reset, the boot mechanism reads the device type from eFuse (step 1015) in secure mode and writes it to Internal RAM. This device type information is available to the boot code when it comes up after a warm reset. The device type is available outside secure mode since after Power-On Reset, the SECCTRL has been set for "Public Debug" and the device does not reenter secure mode until it is reset with a Power-On Reset. If that value in RAM is deleted by an application, or by the warm reset, the device is suitably re-booted when a subsequent power on reset is performed.

The Internal RAM content is unchanged after a warm reset. The boot code can access Internal RAM just after warm reset by releasing RISC peripherals reset in a startup step to enable Internal RAM clock.

Turning to FIG. 3, operations are illustrated for an integrated circuit for a wireless handset 110 of FIG. 1. Operations in the firmware commence with a BEGIN 1001 and go to a step 1010 to read the Production Identification (ID) of the device. Blowing (burning) bits adds an associated effort and expense to manufacture. In one embodiment, GP is represented by the unblown (original) state of one or more E-Fuse bits, and HS is represented by the blown or burnt state. This first approach is economical where demand for the GP device exceeds demand for HS. Another embodiment has HS represented by the unblown state of one or more E-Fuse bits, and GP represented by the blown burnt state. Since somehow reversing the blown state is very unlikely, phones with the blown state are advantageously very unlikely to be turned into phones with the unblown-state functionality. Both embodiments safeguard the secure code and secure hardware as discussed elsewhere herein.

In FIG. 3, step 1015 tests whether the Production ID indicates that the device is a GP device. If not, the device is a HS device and operations branch to Normal Boot operations 1020. Other alternative boot modes in the firmware are GP Full Boot 1040, and GP Fast Boot 1060 described hereinbelow.

If the device is determined to be a GP device in step 1015, operations proceed to a test step 1080 to determine whether Power-On Reset is occurring. If not, a warm reset is occurring and operations branch to a step 1082 to check a RAM variable value defining the type of boot. If in a test step 1084, GP Fast Boot is selected, operations go to GP Fast Boot 1060. Otherwise, operations go from step 1084 to a test step 1086. If in test step 1086, GP Full Boot is selected, operations proceed to GP Full Boot 1040, otherwise to software Reset 1088.

Returning to test step 1080, if Power-On Reset is occurring, operations proceed to a step 1090 to enter Secure Mode. Next, a step 1092 performs a Secure-to-GP Conversion as described further hereinbelow. Next, a test step 1094 tests a GPIO pin to determine if GP Fast Boot is selected. If not, GP Full Boot is assumed, and the RAM variable is set to one (1) in a step 1096. If GP Fast Boot is selected as determined in step 1094, operations proceed to a step 1097 to set the RAM variable to two (2) to represent GP Fast Boot. After either of steps 1096 and 1097, operations pass to a step 1098 to exit Secure Mode, and step 1082 is reached whence operations proceed as described in the previous paragraph.

As noted earlier, the same boot code is suitably used for both GP and HS versions of a given device for handset 110 or 110'. The GP device and handset resist hacking and thus distribution of a GP handset product does not compromise the security of HS handset product versions.

The GP improvements advantageously avoid compromising the security of HS versions in at least the following ways. Exit from Secure mode at step 1098 of FIG. 3 (1199 of FIG. 4C) makes secure ROM space inaccessible, Security Control Register SECCTRL inaccessible, and secure RAM space inaccessible and establishes any other appropriate protections to additionally foster security.

Thus, a software jump from flash memory back to secure ROM causes a security violation. Logic 138 includes hardware-based protection circuitry, also called security monitoring logic, which monitors busses and other parts of the chip for security violations and protects and isolates the protected areas. In one embodiment such a jump from flash to secure ROM, for instance, causes the security monitoring logic to produce an automatic immediate reset of the chip. In another embodiment, such a jump causes the security monitoring logic to produce an error message and a re-vectoring of the jump away from secure ROM. Other security violations would include attempted access to Security Control Register SECCTRL or attempted access to secure RAM space.

Accordingly, this GP device embodiment protects HS security features from compromise. SECCTRL register even in the GP mode is isolated and rendered inaccessible such as to user applications, subsequent to being configured to GP in FIG. 4B steps 1191, 1192, 1193 at Power-On Reset time, by means of the hardware-based protection circuitry to disable all forms of debug access or other access thereto. Access to a secure area of ROM and a secure area of RAM is prevented by hardware-based protection circuitry in GP mode as well. A security state monitor logic circuit performs a hardware-based security protection response if such access is attempted. In this embodiment, SECCTRL register can only be programmed in secure mode which is not re-enterable after Power-On Reset time.

A Secure mode entry sequence of instructions and/or data is established for step 1090 arbitrarily, or otherwise suitably, by the skilled worker. The security state monitor logic is arranged in its monitoring function correspondingly to detect whatever that Secure mode entry sequence of instructions and/or data has been established to be. On a GP device, HS-specific features are rendered inaccessible once the GP device has been booted. If the GP device user attempts to enter secure mode even by the special Secure mode entry sequence of instructions and/or data, the attempt is detected as a security violation (because of the bits identifying the device as a GP device and absence of a power-on reset condition at this time) and protective measures follow immediately.

On Power-On Reset (POR) in GP mode, the secure mode is entered at step 1090 by secure ROM code execution of the Secure mode entry sequence of instructions and/or data. The power-on reset signal is present, and the Security state monitor checks the Secure mode entry sequence of instructions and/or data. Since this Secure mode entry sequence of instructions and/or data has been pre-programmed by manufacturer in the correct authorized manner, the ROM code enters secure mode and executes the operations of FIG. 3 step 1092 and the steps of FIG. 4B out of secure ROM space. No user application is able to operate at POR time because secure ROM code is executed, not user application code. Then occurs secure mode exit 1098 of FIG. 3 or 1199 of FIG. 4B. Thereupon, any subsequent attempts to enter secure mode, even by the special Secure mode entry sequence of instructions and/or data, is detected as a security violation and protective measures follow immediately.

Further adding to the integrity of the GP device, the bits of the E-Fuse are very difficult or impossible to change, once blown. Also, in embodiments wherein the E-Fuse bits in the unblown state represent the GP version, then blowing them only puts the device in a high security (HS) configuration.

Having described the process operations of FIG. 3, these operations including the various boots are described in further detail in connection with FIGS. 4A, 4B, and 4C. Corresponding numerals of FIG. 3 are utilized in corresponding parts of FIGS. 4A, 4B and 4C to facilitate comparison.

Turning to FIG. 4A, operations are illustrated in more detail for an integrated circuit for a wireless handset 110 of FIG. 1, for instance. In one example, the operations are executed on the RISC processor of block 620 in FIG. 2E using block 640 of ROM and RAM, and/or flash 635.

In FIG. 4A, operations in the firmware commence with the BEGIN 1001 and in a step 1006 start to execute code in on-chip ROM space CS0 (chip select zero). Next step 1010 reads the Production Identification (ID) E-Fuse bits of the device. The nonvolatile bits are advantageously uncomplicated and need not be either manufacturer-specific nor platform-specific. Step 1015 tests whether the Production ID indicates that the device is a GP device wherein the two bits for a GP device are unburnt double-zero (00). If the two bits are not double-zero (00) (NO), the device is a HS device and operations branch to Normal Boot operations 1020 and commence operations of a step 1122 (including steps 1122-1134) for authenticated memory booting and/or authenticated peripheral booting. "Memory booting" usually involves booting out of ROM and then going to flash for any further booting. "Peripheral boot" usually involves starting the boot in ROM, then getting more boot code through a peripheral (such as UART or USB), and then completing boot on that code obtained through a peripheral.

These operations now execute a secure mode entry sequence at step 1128. In step 1128, the security control register SECCTRL is set so that the secure watchdog timer is on, and public access to hardware accelerators is prevented. Then operations proceed to a step 1132 to authenticate the ROM code, and further in step 1132 to authenticate the X Loader code and so-called "2ND" Boot Code. X Loader refers to bootstrap code that loads the rest of the code into Flash memory. 2ND means a Flash Loader software that loads software external to the wireless handset via a serial interface (e.g., SSI, UART, or USB) into a flash memory in the handset. "Initial Software" or "INITIAL SW" as used herein mean software typified by X Loader and 2ND Boot Code.

A succeeding step 1133 exits secure mode, and the secure areas of the chip remain protected by a security state machine. Then a step 1134 executes the X Loader code and/or so-called "2ND" Boot Code. Operations of Normal Boot reach a CONTINUE 1135 whereupon any further-provided boot occurs, the operating system is launched, and wireless telephony and associated applications in the handset are executed.

Description now turns to the GP device scenario at step 1015. If the device is a GP device in step 1015, operations proceed to a test step 1080 to determine whether Power-On Reset system status bit SYSST represents Power-On Reset condition. If not, a warm reset is occurring and operations proceed to a step 1137 (compare 1082 of FIG. 3) to check a RAM variable value gp_device_type defining the type of boot. If in test step 1137, GP Fast Boot is selected by a value two (2) in RAM variable value gp_device_type, operations branch via arrow J to FIG. 4C pertaining to GP Fast Boot. Otherwise, operations go from step 1137 to a test step 1139. If in test step 1139, GP Full Boot is selected by a value one (1) in RAM variable value gp_device_type, operations proceed to GP Full Boot 1040. If after test step 1137 followed by test step 1139 neither GP Fast Boot nor GP Full Boot were selected by the RAM variable, operations branch to software Reset 1088.

GP Full Boot block 1040 represents and includes steps 1146-1154. Operations of GP Full Boot are generally analogous to Normal Boot, but GP Full Boot lacks secure mode entry/exit and authentication therebetween, for instance. Operations of GP Full Boot 1040 proceed to a step 1146 to search through the peripherals and memory interfaces for valid boot code. Starting the search in the peripherals followed by the memory interfaces, or conversely starting the search in the memory interfaces followed by the peripherals, is a matter of design choice each method having its particular advantages.

For one example, the GP Full Boot operations search the peripherals by querying the UART and USB interfaces for a signal that a host is trying to boot the system and checks to see if the host has a valid TOC or other suitable information representing acceptable boot code. If no prospect for boot through a peripheral is found, then the external memory interfaces for NAND and/or NOR flash memory are accessed to detect a TOC with valid information. Alternatively, the flash is accessed for other suitable information representing acceptable boot code, but the description here is based on the TOC approach for conciseness. If no valid boot prospect is found, the system takes appropriate default action such as a warm reset. If a valid boot prospect is found, then a step 1146 executes the applicable one of memory booting or peripheral booting, executing without authentication, all from ROM CS0.

Step 1146 includes further operations as detailed in steps 1148, 1150 and 1154. Step 1148 skips ROM code authentication by either lacking authentication in its code as compared with Normal Boot step 1132 or by bypassing authentication in boot code by branching-around in case of GP Full Boot mode gp_device_type=1. Steps 1146 and 1148 respectively contrast with Normal Boot step 1132.

Step 1150 checks for NOR flash, and when NOR flash is present, the code goes to NOR flash memory (chip select CS3), configures EMIFS, and boots from NOR flash CS3 without authentication certificates and with TOC. Suitable address offsetting is used to accommodate NOR or NAND boot, such as a NOR TOC address offset in a reset mode 0. If NAND flash is present, NAND boot is executed without authentication certificates but with TOC. The TOC is also suitably provided with information that points to any more boot code and/or operating system code that is executed following boot.

Step 1154 of GP Full Boot executes a function to call Initial Software (X Loader and 2ND boot code). Compare with step 1134 of Normal Boot. Operations of GP Full Boot reach a CONTINUE 1156 whereupon any further-provided boot occurs, the operating system is launched, and wireless telephony and associated applications in the handset are executed. Alternatively, where code for step 1154 might be redundant, step 1150 is succeeded by step 1134 itself and then CONTINUE 1135.

Turning to FIG. 4C, GP Fast Boot operations are based on the idea of preparing the processor with a minimum of integrated circuit manufacturer code preliminary to execution of system manufacturer latter-supplied boot code and/or other code. Advantageously, the preparing of the processor arranges things so that such latter-supplied code, when that latter-supplied code executes, will see the processor as if booting or other operations were just starting with the latter-supplied code.

In FIG. 4C, GP Fast Boot is reached via arrow J from FIG. 4A decision step 1137. In FIG. 4C, operations first configure EMIFS (external memory interface slow) CS3 and use read mode zero (0) in a step 1162. EMIFS configures accesses to external off-chip memory. For GP Full Boot, the EMIFS is configured automatically by the boot code, and for GP Fast Boot, a function in the boot code is called that suitably does the same EMIFS configuration. Next step 1060 jumps from on-chip ROM CS0 from which operations have been executing since step 1006 of FIG. 4A. In FIG. 4C, step 1060 the jump goes to GP Fast Boot trampoline code in test SRAM that is previously established as described in connection with FIG. 4B hereinbelow. The trampoline code includes steps 1164, 1166, 1168, 1172, 1176, next described.

In FIG. 4C, operations go from step 1060 to a step 1164. In step 1164 the trampoline code sets the Boot Mode (BM) bit of an addressable EMIFS_CONFIG register in order to swap CS3 and CS0 physical address mapping. To avoid complicating code space allocation and execution in the CS0 and CS3 spaces themselves, the swap step 1164 in particular is situated in and executed from test SRAM, or in general, from a temporarily-used third distinct space outside of both the CS0 and CS3 spaces. In the "big picture" of operations, a transition of execution from internal ROM space to flash memory space is underway. The transition is being facilitated, in the "little picture" of FIG. 4C, by the intermediate execution of the testSRAM trampoline code with its swap step 1164 in this temporarily-used third distinct space. In this example, the precise moment of the completion of transition of execution does not happen just yet, indeed not until later in step 1176.

In the meantime, a step 1166 skips memory booting and peripheral booting (in contrast to GP Full Boot step 1146 and Normal Boot step 1122). Step 1166 "skips" memory booting and peripheral booting 1) by either lacking memory and peripheral booting code, as compared with either Normal Boot step 1122 or GP Full Boot step 1146, or 2) by bypassing existent memory and peripheral booting code by branching-around in case of GP Fast Boot mode gp_device_type=2, depending on embodiment. In this example, where GP Fast Boot has a memory remapping feature and trampoline code is used, the "skip" occurs by having the trampoline code lack memory booting and peripheral booting code therein as compared with Normal Boot or GP Full Boot.

Then a step 1168 disables interrupts, followed by a step 1172 that puts the RISC core in a predefined hardware mode such as ARM Supervisor Mode that allows modification of status bits and access to some resources of the RISC core that are not available in another hardware mode such as User Mode. In this way, the GP Fast Boot steps 1164-1172 establish a prepared environment in which the latter-supplied code in flash will see itself as if it were CS0 space (which the swap 1164 has brought about and into which newly-mapped CS0 the step 1176 will branch). The environment is prepared in part, by disabling the interrupts in step 1168 so that latter-supplied code is advantageously not interruptable unless the latter-supplied code itself enables interrupts. The prepared environment is completed by step 1172 putting resources of the RISC core at the disposal of the latter-supplied code, whereupon step 1176 branches to the latter-supplied code.

Accordingly, following GP Fast Boot step 1172, operations at step 1176 now jump out of the testSRAM-situated trampoline code by branching to a predetermined address such as 0x00000000. Because the mapping was changed by swap 1164, this predetermined address is in flash memory, and not internal ROM now. The predetermined address is an address pre-established for the beginning of operations of the above-mentioned latter-supplied code. The latter-supplied code suitably includes boot code, and/or operating system (OS) code followed by wireless telephony operations and other wireless handset applications.

The applications processor chip 600 has terminals for coupling to external flash memory on the printed circuit board, and the GP Fast Boot self-copying code at step 1176 suitably provides a jump to the external memory, for example, NOR flash. Alternatively, step 1176 jumps to whatever on-chip or off-chip memory space has been remapped for the purpose. In another example of step 1176, the branch is made to an internal SRAM space whereupon the latter-supplied code boots from peripheral or from a type of memory as the skilled worker may designate in that code.

By contrast with FIG. 4C GP Fast Boot, just described, GP Full Boot of FIG. 4A illustrates a case of a lower-security boot code originally supplied with the integrated circuit but with no address remapping as by swapping CS0 and CS3 physical address spaces and thus no trampoline code being utilized in GP Full Boot.

In general, it is contemplated that embodiments be prepared utilizing selectively determinable boot sequences and boot modes with whatever variety of security and feature gradations, booting philosophies, and advantages are convenient to establish by the application of the principles disclosed herein, for meeting the particular needs of chip manufacturer, system manufacturer, and user circumstances.

Returning to test step 1080 of FIG. 4A, if Power-On Reset is occurring (SYSST=1), operations proceed via arrow H to FIG. 4B to perform Secure Mode entry sequence at step 1090.

In FIG. 4B, all the steps of FIG. 4B execute out of secure ROM at Power-On Reset time. Next, a step 1092 performs a Secure-to-GP Conversion as described next. Step 1191 disables the secure watchdog timer. Step 1192 enables public access to hardware acceleration. Step 1193 enables public debug. "Public debug" herein means debug is permitted only in non-secure sections of the chip, and all access is prevented to the secure sections of the chip. For example, "public debug" prevents access to secure ROM space, prevents access to secure RAM space, prevents access to security state monitor logic, and prevents access to the secure register Security Control SECCTRL.

Advantageously in this GP device embodiment, Secure ROM code is only entered at Power-On Reset time. In general, the skilled worker suitably arranges and isolates public debug from access to any and all parts of the chip which are intended for secure use or need to be inaccessible to block hacking scenarios which the skilled worker has identified. Parts of ROM space may be allocated for other than secure uses, and those non-secure addresses in ROM are suitably made accessible to public debug.

Next a test step 1194 tests external GPIO pin 13 for state zero (0) or not. This GPIO_13 state is established by a hard-wired ground or by a mode switch (not shown) on the printed wiring board to which the applications processor 600 in FIG. 2F has its GPIO_13 pin connected. If GPIO_13 does not have state zero (0), then a step 1196 sets the RAM variable gp_device_type to one (1) for GP Full Boot. If GPIO_13 does have state zero (0) at step 1194, then operations proceed to a step 1197 to set the RAM variable gp_device_type to two (2) for GP Fast Boot. From step 1197, operations proceed to a step 1198 to self-copy ROM trampoline code into non-secure ("public") on-chip test SRAM memory for GP Fast Boot purposes as used at step 1060 in FIG. 4C. Thus, boot storage includes at least a portion of an internal memory and GP Fast Boot has self-copying code in the internal memory first in ROM and then in both ROM and RAM. In step 1198, the FIG. 4B boot sequence for GP device in secure mode is copying code from one memory (secure ROM) to another memory (publicly-accessible test SRAM) for subsequent use by the Fast Boot mode of FIG. 4C. After either of steps 1196 and 1198 in FIG. 4B, operations pass to a step 1199 to exit Secure Mode, set certain ASIC_ID security fields to zero, and pass via arrow "I" to FIG. 4A. Arrow "I" goes to step 1137, and operations proceed thereafter as described hereinabove. (In an alternative example, step 1199 is executed instead just after step 1193, and steps 1194, 1196, 1197, 1198 are executed outside of secure mode in code situated in public ROM space. Then arrow "I" is reached directly after either of steps 1196 and 1198.)

As described in connection with FIG. 1 and FIG. 4B, an integrated circuit is provided that has security monitoring circuitry 138 and ROM storage 132 including boot code firmware that has a first firmware portion (e.g. HS Normal Boot in FIG. 4A) and a second firmware portion (e.g., the power-on reset GP portion of FIG. 4B). Each of these first and second firmware portions establishes a secure mode entry sequence and an exit from secure mode. In HS Normal Boot portion of FIG. 4A, secure mode entry step 1128 and secure mode exit step 1133 bracket both the HS configuration in the security control register SECCTRL (or brackets for this purpose where SECCTRL is designed to default to the HS states) and also the authentication in step 1132 for higher security. In GP portion of FIG. 4B, secure mode entry step 1090 and secure mode exit step 1199 bracket the GP configuration steps 1191, 1192, 1193 in the security control register SECCTRL for lower security (or brackets for this purpose in SECCTRL is designed to default to the GP states). The security monitoring circuitry 138 is coupled to ROM storage 132 upon exit from secure mode even when GP configuration of SECCTRL for lower security has occurred, to protect the HS boot code and GP boot code in such space in secure ROM as holds the first and second firmware portions just discussed. Also, the security control register SECCTRL in the lower security configuration, is inaccessible to user code after the secure mode exit step 1199.

The non-volatile E-Fuse bits 140, when they are set for HS or GP operation, select between the first firmware portion (e.g. HS Normal Boot of FIG. 4A) and second firmware portion (e.g. GP power-on reset (POR) configuration of FIG. 4B) for execution. The security monitoring circuitry 138 is coupled to the ROM storage 132 to prevent execution of that (GP POR FIG. 4B) second firmware portion except in the case of a hardware reset. Put another way, security monitoring circuitry 138 is responsive to a hardware reset to accept a secure mode entry sequence by the second firmware portion. Also, the boot code firmware includes code step 1080 establishing a bypass of the (GP POR FIG. 4B) second firmware portion except in the case of a hardware reset.

The security monitoring circuitry 138 has an input for a hardware reset and is coupled to detect execution of the secure mode entry sequence on the bus(es) to the ROM storage 132 to prevent execution of the first firmware portion except in the case of a hardware reset. The security control register SECCTRL is accessible by the second firmware portion (e.g., FIG. 4B) in steps 1191, 1192, 1193. Secure RAM (random access memory) is accessible by the second firmware portion starting at step 1090. The security monitoring circuitry 138 is responsive to a security violation to reset the integrated circuit or re-vector execution away from the protected space.

The Production ID[30:31] bits in the non-volatile E-Fuse bits 140 advantageously are not and need not be either manufacturer-specific nor platform-specific. In other words, the GP and HS states of these bits [30:31] identify neither the manufacturer nor the particular handset. Among further advantages, the Production ID[30:31] bits are suitably accessible and readable outside of secure mode for purposes of the step 1015 of FIGS. 3 and 4 without exposing special purpose bits like the MPK and other such bits which are suitably kept inaccessible and electronically unreadable, except inside secure mode such as at step 1128 of Normal Boot in FIG. 4A. In FIG. 4A, secure mode is not entered on all types of GP resets, as when lower-security warm reset (NO at step 1080) does not enter secure mode while lower-security hardware POR reset enters secure mode (YES at step 1080). Advantageously, the Production ID[30:31] bits are accessible outside of secure mode on either and both of HP and GP devices, and in case of either and both of warm reset and hardware reset, while MPK and other such bits remain protected from access except in secure mode. Outside of secure mode, software thus checks bits [30:31] at step 1015 and in the GP case determines which reset is occurring, and only then branches to code that accesses secure mode in the case of hardware reset where entry into secure mode is involved.

Figure 5:
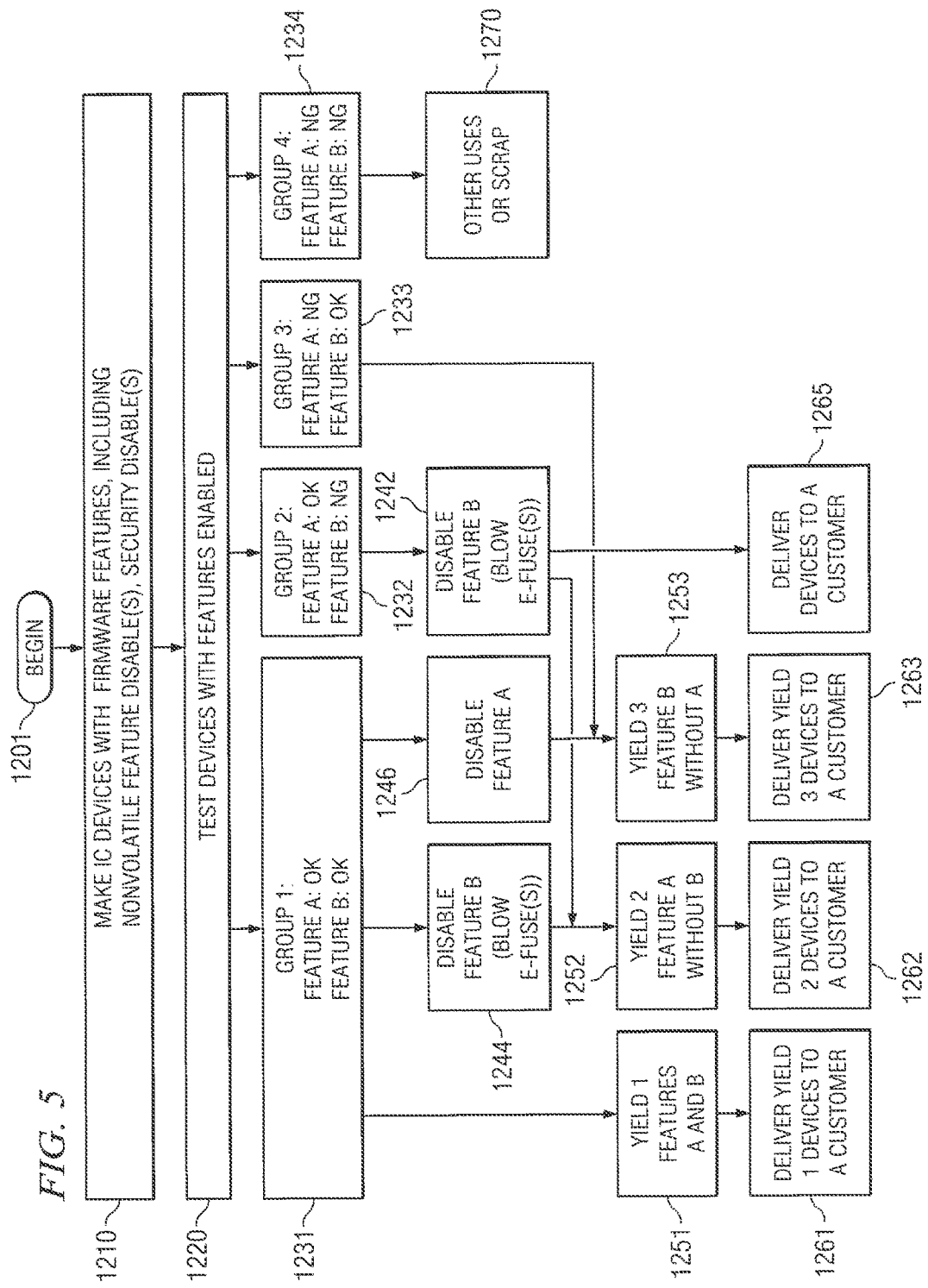
FIG. 5 is a flow diagram of a manufacturing and delivery process suitably practiced by a manufacturer of integrated circuit devices.
Figure 6:
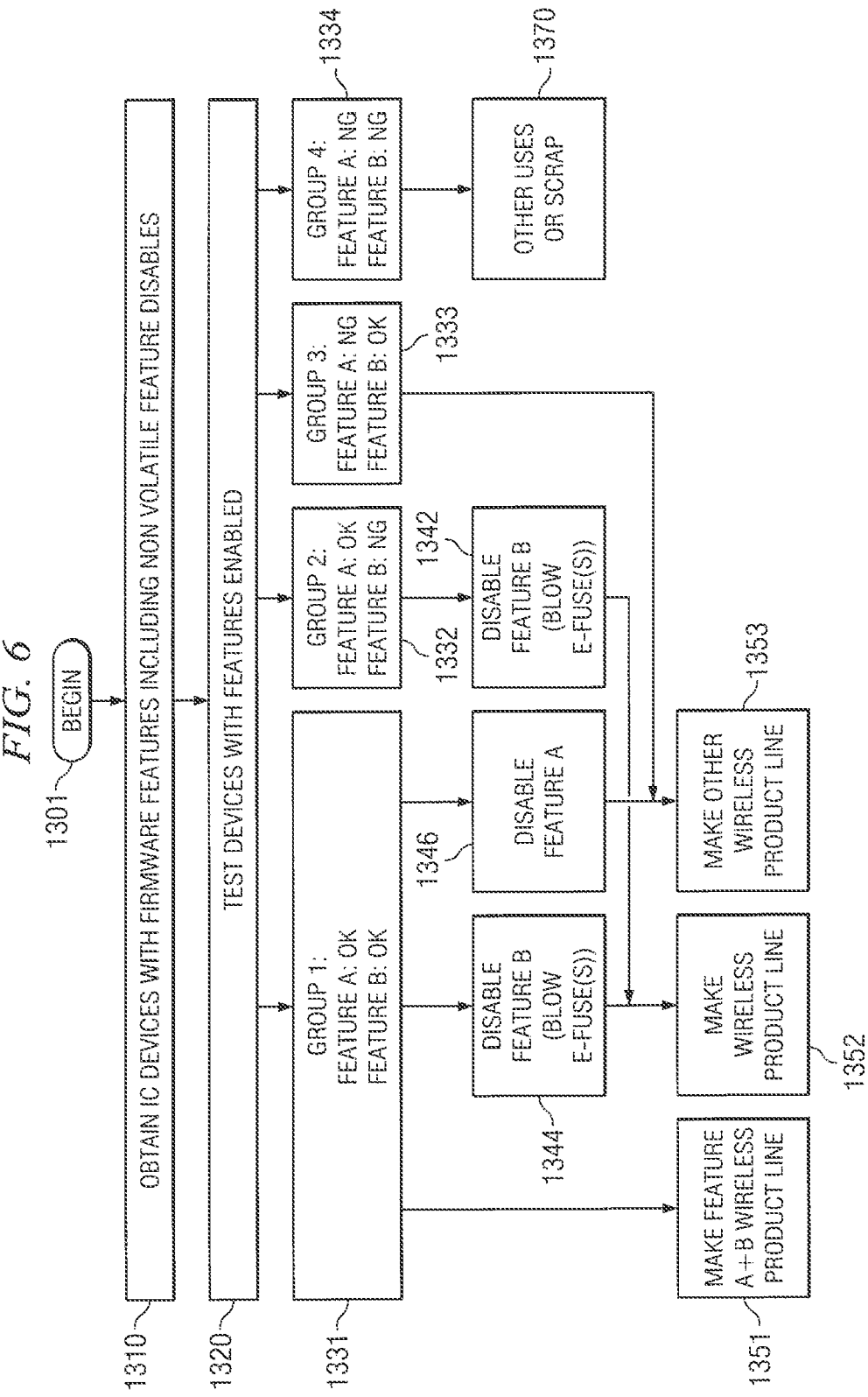
FIG. 6 is a flow diagram of another manufacturing process suitably practiced by a customer receiving integrated circuit devices and making wireless products for one or more of the system blocks of FIG. 1.
Figure 7:
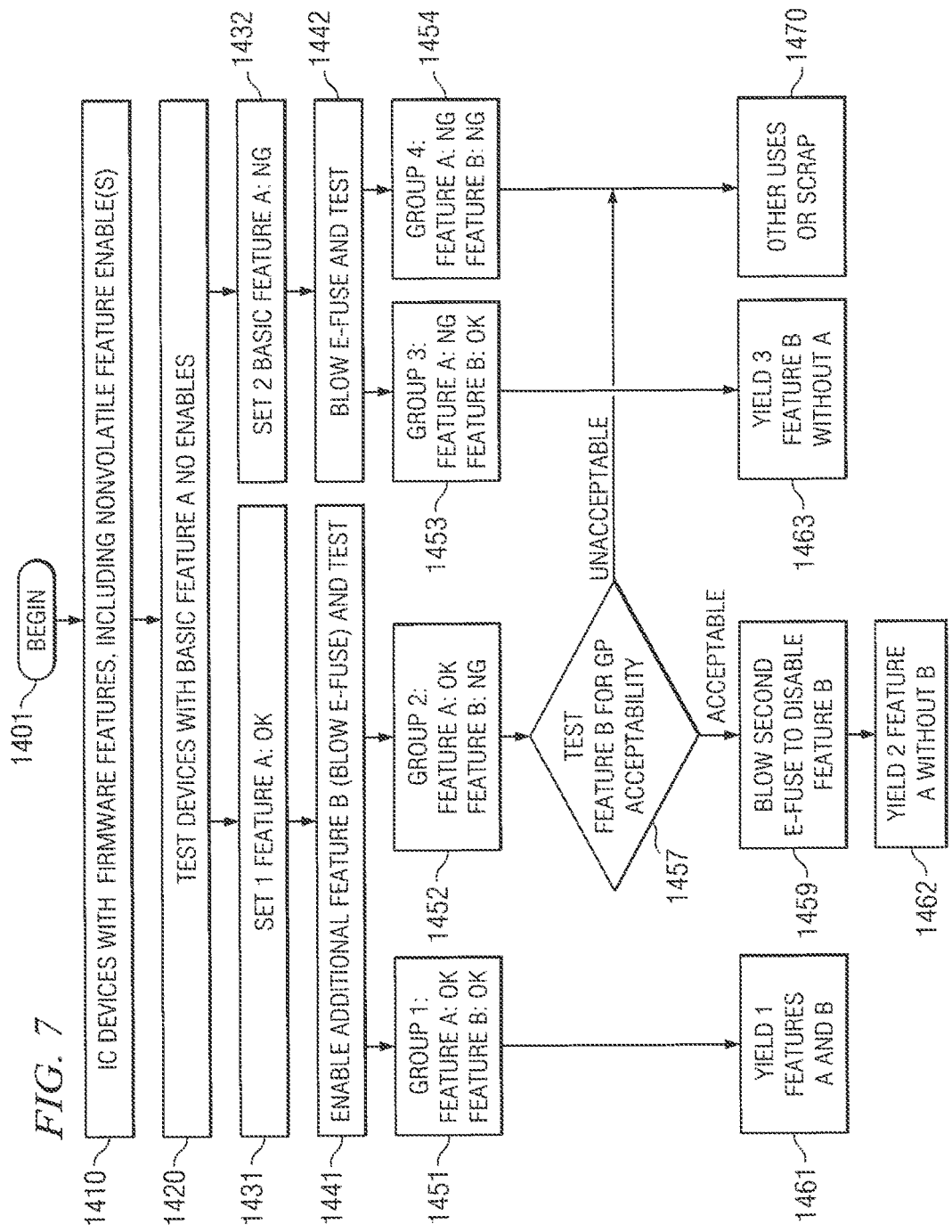
FIG. 7 is a flow diagram of a further manufacturing process of devices.

FIGS. 5, 6 and 7 show different process embodiments for manufacture of products.

In FIG. 5, a process of manufacturing integrated circuit devices has a yield subject to a yield loss in manufacturing. Operations commence with BEGIN 1201 and go to a step 1210 to make the integrated circuit devices to have a first feature A (e.g., a wireless application or set of functional applications) and a second feature B (e.g., lower-security with feature B enabled; higher security with feature B disabled). At least the second feature B has a state of disablement or enablement dependent on an on-chip alterable non-volatile element. The non-volatile element suitably includes an E-Fuse or plurality of E-Fuses holding one or more bits of information with associated logic to respond to states of the non-volatile element depending on which parts are altered or not (e.g. selectively blown or burnt), to establish the features which the states represent. Advantageously, all the integrated circuits in the process of FIG. 5 include ROM code firmware as part of each device. The firmware is the same code in each of the devices, and the code is differently responsive in at least some of the devices (e.g. Groups 1 and 2) to the non-volatile element as unaltered and altered.

In some embodiments, at least two of the non-volatile bits are selectively altered. Some other process embodiments alter only a first single one of the non-volatile bits in a first set of the devices and alter only a different single one of the non-volatile bits in a second set of the devices. Further embodiments alter at least one of the non-volatile bits in a first set of the devices to enable the second feature, and then alter a different at least one of the non-volatile bits in some of the first set of the devices to disable the second feature. In some forms of the process, the second feature is disabled when the on-chip non-volatile element is altered. In other forms of the process, the second feature is enabled when the on-chip non-volatile element is altered.

It is emphasized here that while some embodiments may have an entire feature totally absent or totally present, other embodiments, such as those performing the steps of FIGS. 3, 4A, 4B and 4C, have more or less complex arrangements that execute some code portions, selectively bypass others, and have some operations running concurrently sequentially regardless. Accordingly, words such as "enable," "disable," "operative," "inoperative" are to be interpreted relative to the code and circuitry they describe. For instance, disabling (or making inoperative) a lower-security bypass of a higher-security function can establish the higher-security function and modify the lower-security function. Conversely, making a higher-security function inoperative includes embodiments where a portion of the high security function is bypassed or modified as well as embodiments where all security is removed entirely. Bypassing or modifying code increases security in some embodiments and decreases security in other embodiments.

Further in FIG. 5, a step 1220 then tests the integrated circuit devices so made with the second feature B (e.g. lower security) enabled thereby identifying various groups (Group 1, 2, 3, 4) of devices depending on which features are operative or not. For instance, step 1220 tests and identifies in step 1231 a first group of the devices that have both first feature A operative and the second feature B operative, in the sense that the devices pass the testing of both features A and B. The testing of step 1220 identifies in step 1232 a second group of the devices that have the first feature A operative and the second feature B inoperative in the sense that the second group pass the testing of feature A and do not pass the testing of feature B. Also, the testing of step 1220 identifies in a step 1233 a third group of the devices that have the first feature A inoperative (or perhaps only some wireless applications operative and others inoperative) and the second feature B operative, and identifies in a step 1234 a fourth group of the devices that have both the first feature A and the second feature B inoperative.

Next, a step 1242 alters the non-volatile element (e.g., blows the E-Fuse or does a one-time write or otherwise) in at least one device from the second group to disable the second feature B (e.g. produce higher-security version). Since these devices may lack fully operative second feature B, as many as all the devices in Group 2 suitably have the non-volatile element altered to make them Yield 2 (e.g. higher-security) devices. These Yield 2 devices are tested for operation appropriate to the thus-altered feature set. In this way, the overall yield of the process as a whole is augmented with the at least one device thus altered in step 1242 from Group 2 because Group chips would not otherwise have been commercially useful without the feature B disable (e.g. security code bypass to produce higher-security features).

Suppose production planning and/or customer-demand determine that the number of YIELD 2 devices needed exceeds the number produced in Group 2 and some devices from Group 1 can be made into YIELD 2 devices taking customer demand for full-featured Group 1 devices into account. Then in a step 1244 an appropriate number of Group 1 devices also have their non-volatile element altered, the devices then being tested for appropriate operation to convert them into part of Yield 2 at step 1252. A step 1246 disables feature A and leaves feature B operational where there is a commercial purpose for providing devices of such functionality from Group 1 as well.

The manufacturer thus saves in step 1251, as a Yield 1 of the process, devices in Group 1 with the non-volatile element unaltered. In step 1252, Yield 2 of the process has Group 1 devices with the non-volatile element altered and Group 2 devices with the non-volatile element altered. In a step 1253, a Yield 3 of the process has step 1233 Group 3 devices with Feature A disabled and Feature B enabled plus step 1246 Group 1 devices with feature A disabled by altering a non-volatile element for feature A. The step 1233 output further augments yield of the process of FIG. 5 as a whole.

A step 1261 delivers to a customer Yield 1 devices with the non-volatile element unaltered so that Features A and B are both present. A step 1262 delivers as a second yield of the process for a customer, Group 1 devices with the non-volatile element altered and Group 2 devices with the non-volatile element altered. A step 1263 delivers as a third yield of the process for a customer, part or all Group 3 and Group 1 devices with feature A disabled in step 1246 and Feature B enabled. A step 1265 delivers to customer, devices with Feature A enabled and Feature B disabled out of step 1242 without addition of any Group 1 devices from step 1244. A step 1270 suitably utilizes Group 4 devices that have any commercially usable functionality by burning fuses for all non-functional aspects, leaving the functional aspects usable, and delivering the devices for use. If the devices are unusable, they can be scrapped.

FIG. 6 shows a process of manufacturing first and second different products, where, for but one example, the manufacturer is an original equipment manufacturer (OEM) of the products. In general, the first product has a first feature A and a second feature B, and the second product has the first feature A with the second feature B disabled. For example, the first product suitably is a higher-security wireless handset and the second product is a lower-security wireless handset.

The process commences with BEGIN 1301. OEM in a step 1310 obtains the integrated circuits such as from an upstream supplier or manufactures the integrated circuits in a separate operation. OEM at the end of the process suitably combines the integrated circuits with other electronic components on a printed circuit board as in FIG. 1 to make the two (or more) products in FIG. 6 steps 1351, 1352, 1353. OEM utilizes integrated circuit devices that have, at least in at least some of the devices, imperfectly resulted from upstream fabrication subject to yield loss so that only some devices support both the first feature A and the second feature B. The second feature B has a state of disablement or enablement dependent on an on-chip alterable non-volatile element (e.g., an E-Fuse).

After obtaining devices by step 1310, the OEM tests the integrated circuit devices in step 1320 with the non-volatile element unaltered thereby identifying in a step 1331 Group 1 devices that have both first feature A operative and the second feature B operative, and in a step 1332 Group 2 devices that have the first feature A operative and the second feature B inoperative. In addition, a step 1333 identifies devices that have first feature A inoperative and second feature B operative. Also, a step 1334 identifies devices that have both features A and B inoperative.

From step 1331, the manufacturer provides at least one Group 1 device into manufacturing of the first product, such as a full feature HS wireless handset product line. From step 1332 and according to a step 1342, the manufacturer alters the non-volatile element in at least one Group 2 device. From step 1342, manufacturer provides at least one Group 2 device tested with non-volatile element altered, into step 1352 manufacturing of the second product, such as a lower-security wireless handset product line.

Step 1342 advantageously augments the integrated circuits available to the manufacturer. Depending on production planning and downstream customer demand, Group 1 devices may also need to be converted to make the second product. To accomplish this, a step 1344 alters the non-volatile element of at least one Group 1 device to disable second feature B, and provides it also into step 1352 manufacturing of the second product, such as a lower-security wireless handset product line.

From step 1333 manufacturer provides at least one Group 3 device with first feature A disabled (as by burning other E-fuses or hardwiring a selection pin) and second feature B operative into a step 1353 manufacturing of a third product, such as an additional wireless handset product line. Steps 1333 and 1353 advantageously augment the integrated circuits available to the manufacturer for the additional product line. Depending on production planning and downstream customer demand, Group 1 devices may also need to be converted to make the additional third product. To accomplish this, a step 1346 additionally alters a non-volatile element pertaining to first feature A of at least one Group 1 device to disable first feature A and leave second feature B enabled, and provides the altered Group 1 device(s) also into step 1353 manufacturing of the third product.

A step 1370 suitably utilizes Group 4 devices that have any commercially usable functionality by blowing fuses for all non-functional aspects, leaving the functional aspects usable, and delivering the devices into manufacturing of a fourth product. Otherwise, if the devices are unusable, they can be scrapped.

Comments made in connection with FIG. 5 regarding firmware in common to the product lines, alternative embodiments of plural fuses, and altering bits to either enable or disable features also illustratively apply to the process and products of FIG. 6.

In FIG. 7, another process embodiment of manufacturing integrated circuit devices has a two-step testing approach. Operations commence with BEGIN 1401 and a step 1410 of making the integrated circuit devices to have firmware features including a first feature A and a second feature B. The second feature B has a state of disablement dependent on an on-chip alterable non-volatile element when unaltered and a state of enablement when the on-chip alterable non-volatile element is altered.

Next, a step 1420 tests the integrated circuit devices so made with the on-chip alterable non-volatile element unaltered to identify in step 1431 Set 1 devices that have the first feature A operative, and to identify Set 2 devices that have the first feature A inoperative in corresponding step 1432. Out of the Set 1 devices from step 1431, a step 1441 alters the non-volatile element in one or more Set 1 devices and tests them. Testing each Set 1 device so altered identifies Group 1 devices in step 1451 that not only have the first feature A operative but also second feature B operative and Group 2 devices in step 1452 that have the first feature A operative and the second feature B inoperative.

The Group 2 devices are suitably tested in a step 1457 to determine which Group 2 devices are acceptable for example as lower-security devices as described earlier hereinabove. Then a step 1459 alters a further non-volatile element in the Group 2 devices that have the first feature A operative and the second feature B inoperative, to assuredly disable the second feature B. The result is a Yield 2 feature A without B device in step 1462. In this way, the Yield 2 devices augment the yield of the process of FIG. 7. In the meantime, the Group 1 devices are provided to output or further manufacturing step 1461 as Yield 1 (both features A and B operative) of the process.

Turning attention to step 1432, there the Set 2 devices are such that first feature A is inoperative. The non-volatile element is altered in a step 1442 and the devices are tested. Step 1453 identifies Group 3 devices that have the first feature A inoperative but second feature B operative. Step 1454 identifies Group 4 devices that have both features A and B inoperative.

From step 1453, the Group 3 devices are provided to output or further manufacturing step 1463 as Yield 3 (feature B operative without A) of the process. In the meantime, a step 1470 suitably utilizes Group 4 devices from step 1454 that have any commercially usable functionality by blowing further fuses associated with logic that responds to disable all non-functional aspects, leaving the functional aspects usable. Similarly, step 1470 handles devices from step 1457 that have failed the testing in that step 1457. The step 1470 devices are delivered into manufacturing of a fourth product, but if the devices are completely unusable, they can be scrapped.

FIGS. 8A and 8B show examples of different logics included in logic 138 and E-Fuse bits 140 in the handset 100 of FIG. 1 and the applications processor 600 of FIGS. 2E and 2F. The logic and E-Fuse bits provide different ways of establishing feature disables to use in the processes of FIGS. 3, 4A, 4B, 4C, 5, 6, and 7. At least two of the non-volatile bits are selectively alterable.

In FIG. 8A, circuitry 1500 has E-Fuse bits 1510 including bits 29, 30, and 31 in the Production ID register of the device. Blowing an E-Fuse bit makes it correspond to a logic one (1) for the present example. A NOR-gate 1520 has inputs respectively connected to bits 29 and 30, and its output connected to provide a low-active signal !Disable Feature A. A NOR-gate 1530 has inputs respectively connected to bits 30 and 31, and its output connected to provide a low-active signal !Disable Feature B. Sub-features of features A and B are suitably disabled independently of the E-Fuse bits by further bits and similar logic disables into sub-portions of circuitry implementing features A and B. Further features C, D, E, etc. are provided by providing applications logic and/or software for them. Disablement of the further features C, D, E, etc. is accomplished by adding further production ID bits in block 1510 and adding NOR-gates or inverters as appropriate by repetition of the structures shown in FIG. 8A.

Circuitry 1500 is useful for purposes of the processes of FIGS. 5 and 6 where altering only a first single one of the non-volatile bits in a first set of the devices disables Feature B (steps 1242, 1244 or 1342, 1344) and altering only a different single one of the non-volatile bits in a second set of the devices disables Feature A (step 1246 or 1346).

In FIG. 8A, all bits 29, 30 and 31 start out unblown, or logic double-zero (00) at inputs of NOR-gate 1520 and logic double-zero (00) at inputs of NOR-gate 1530. The output of NOR-gates 1520 and 1530 are both high, meaning that neither Feature A (e.g., wireless apps) nor Feature B (e.g., security) is disabled for purposes of test step 1220 or 1320. Then in any or all of steps 1242, 1342, 1244, and 1344, E-Fuse bit 31 is blown making it logic one (1) while E-Fuse bits 29 and 30 remain logic zero (0). Logic zero-one (01) appears at the inputs of NOR-gate 1530, producing an output low, signifying a disable of Feature B. Feature A remains since bits 29 and 30 are unchanged.

In either or both of steps 1246 and 1346, the E-Fuse bit 29 is blown, making it logic one (1). In these steps, E-Fuse bits 30 and 31 remain unchanged (00). Logic one-zero (10) from bits 29 and 30 appears at the inputs of NOR-gate 1520, producing an output low and signifying a disable of Feature A. Feature B remains since E-Fuse bits 30 and 31 are unchanged.

In either or both of steps 1234 and 1334 where testing has shown both Features A and B to be defective, E-Fuse bit 30 is treated according to any of the following alternatives. First Alternative: Bit 30 is blown, making it a logic one (1), forcing the outputs of both NOR gates 1520 and 1530 low to disable both Features A and B and deter or prevent inadvertent use of the defective chip or simplify detection of such use. Second Alternative: Blow bit 30 only for chips to be scrapped. Other bits (not shown) are suitably blown to disable portions of Feature A and Feature B leaving a partially usable chip for some purposes, for example. Then bit 30 would be left unblown. Third Alternative: Omit the connection of bit 30 to the NOR-gates 1520 and 1530, and hardwire a logic zero (0) to the bit 30 inputs of those NOR-gates such as by grounding those inputs or replacing the NOR-gates 1520 and 1530 with inverters.

In FIG. 8B, circuitry 1600 has E-Fuse bits 1610 including bits 30 and 31 in the Production ID register of the device. A NAND-gate 1620 has one input connected to bit 30 and an inverting input connected to bit 31. NAND-gate 1620 has its output connected to provide a low-active signal !ENABLE (enable-bar) meaning that a low output represents an enable signal.

Circuitry 1600 is useful for purposes of the process in FIG. 7 where altering at least one of the non-volatile bits in a first set of the devices enables the second feature B, and then altering a different at least one of the non-volatile bits in some of the first set of the devices disables the second feature B.

In FIG. 8B, both bits 30 and 31 start out unblown, or logic double-zero (00). The output of NAND-gate 1620 is high, meaning that Feature B (e.g., security) is initially not enabled for test step 1420. Then in step 1441, E-Fuse bit 30 is blown making it logic one (1) while E-Fuse bit 31 remains logic zero (0). Logic one-zero (10) appears at the inputs of NAND-gate 1620, producing an output low, signifying an enable of Feature B. Later, when needed for step 1459, the E-Fuse bit 31 is blown, making it logic one (1). Logic one-one (11) appears at the inputs of NAND-gate 1620, producing an output high, signifying assured disablement of Feature B for purposes of step 1459.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, and other circuitry, and digital computers including microprocessors and microcomputers of any architecture, or combinations thereof. Internal and external couplings and connections can be ohmic, capacitive, direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. It is therefore contemplated that the appended claims and their equivalents cover any such embodiments, modifications, and embodiments as fall within the true scope of the invention.

What is claimed is:

1. An integrated circuit comprising:
a first memory to store boot instructions, the boot instructions including first instructions defining a first boot sequence that is a secure boot sequence and second instructions defining a second boot sequence that is a less secure boot sequence relative to the first boot sequence;
a storage element to store one of a first state and a second state, wherein the first state indicates a first operation mode that is a secure mode of operation and the second state indicates a second operation mode that is a less secure mode of operation relative to the first operation mode;
security feature circuitry including a secure hardware accelerator to perform one or more security features; and
a processor configured to determine whether the storage element stores the first state or the second state and, depending on the state stored by the storage element, execute a selected one of the first and the second boot sequences, wherein the execution of the selected one of the first and second boot sequences selectively causes the security feature circuitry to be in the secure mode or the less secure mode;
wherein:
when the processor determines that the storage element stores the first state, the processor executes the first boot sequence and the security feature circuitry is caused to be in the secure mode in response to execution of the first boot sequence in which the secure hardware accelerator cannot be accessed by public access; and
when the processor determines that the storage element stores the second state, the processor executes the second boot sequence and the security feature circuitry is caused to be in the less secure mode in response to execution of the second boot sequence in which the secure hardware accelerator can be accessed by public access.

2. The integrated circuit of claim 1, wherein the one or more security features include at least one of encryption acceleration or decryption acceleration.

3. The integrated circuit of claim 2, wherein a type of the encryption is a hash-based encryption, a symmetric encryption, or an asymmetric encryption.

4. The integrated circuit of claim 1, wherein the security feature circuitry comprises a secure watchdog timer.

5. The integrated circuit of claim 4, wherein:
the secure watchdog timer is enabled when caused to be in the secure mode in response to the processor executing the first boot sequence; and
the secure watchdog timer is disabled when caused to be in the less secure mode in response to the processor executing the second boot sequence.

6. The integrated circuit of claim 1, wherein the storage element comprises non-volatile storage.

7. The integrated circuit of claim 6, wherein the storage element is one-time-programmable.

8. The integrated circuit of claim 6, wherein the storage element includes electronic fuse (eFuse) circuitry.

9. The integrated circuit of claim 1, wherein the first and second states are indicated by at least two bits of the storage element.

10. The integrated circuit of claim 1, wherein the first memory is a read-only memory (ROM).

11. The integrated circuit of claim 1, wherein:
the security feature circuitry is configured to have a default state of being in the secure mode on power up of the integrated circuit; and
the processor is configured to determine a state of the storage element on power up of the integrated circuit and, when the state of the storage element indicates the second state, cause the security feature circuitry to change from the secure mode to the less secure mode.

12. The integrated circuit of claim 11, further comprising a power-on reset (POR) circuit, wherein the power up of the integrated circuit is detected in response to a signal supplied by the POR circuit.

13. An integrated circuit comprising:
a first memory to store boot instructions, the boot instructions including first instructions defining a first boot sequence, second instructions defining a second boot sequence, and third instructions defining a third boot sequence;
a storage element to store one of a first state and a second state, wherein the first state indicates a secure mode and the second state indicates a less secure mode;
security feature circuitry to perform one or more security features, wherein the security feature circuitry includes a secure watchdog timer; and
a processor configured to:
determine whether the storage element stores the first state or the second state;
execute the first boot sequence when the storage element stores the first state; and
execute a selected one of the second and third boot sequences when the storage element stores the second state;
wherein the security feature circuitry is caused to be in the secure mode in response to the execution of the first boot sequence when the storage element stores the first state and is caused to be in the less secure mode in response to the execution of the selected one of the second and third boot sequences when the storage element stores the second state;
wherein the secure watchdog timer is enabled when caused to be in the secure mode in response to the processor executing the first boot sequence and is disabled when caused to be in the less secure mode in response to the processor executing either one of the second and third boot sequences.

14. The integrated circuit of claim 13, further comprising a first input/output (I/O) pin, wherein, the processor determines that the storage element stores the second state, the processor selects the second boot sequence for execution when a signal provided by the first I/O pin has a first state and selects the third boot sequence for execution when the signal provided by the first I/O pin has a second state.

15. The integrated circuit of claim 14, wherein the second boot sequence is a general purpose full boot sequence and the third boot sequence is a general purpose fast boot sequence.

16. The integrated circuit of claim 14, wherein the third boot sequence is faster than the second boot sequence.

17. The integrated circuit of claim 14, wherein the state of the signal provided by the first I/O pin is stored as information in a second memory, and the processor selects the second boot sequence or the third boot sequence depending on the information in the second memory.

18. The integrated circuit of claim 17, wherein, when the signal provided by the first I/O pin has the second state, the processor is configured to cause at least a portion of the third instructions stored in the first memory to be copied into the second memory.

19. The integrated circuit of claim 13, wherein the security feature circuitry comprises a secure hardware accelerator.

20. The integrated circuit of claim 19, wherein the one or more security features include at least one of encryption acceleration or decryption acceleration.

21. The integrated circuit of claim 20, wherein a type of the encryption is a hash-based encryption, a symmetric encryption, or an asymmetric encryption.

22. The integrated circuit of claim 19, wherein:
when the secure hardware accelerator is caused to be in the secure mode in response to the processor executing the first boot sequence, the secure hardware accelerator is not accessible by public access; and
when the secure hardware accelerator is caused to be in the less secure mode in response to the processor executing the selected one of the second and third boot sequences, the secure hardware accelerator is accessible by public access.

23. The integrated circuit of claim 13, wherein the storage element comprises non-volatile storage.

24. The integrated circuit of claim 23, wherein the storage element is one-time-programmable.

25. The integrated circuit of claim 23, wherein the storage element includes electronic fuse (eFuse) circuitry.

26. An integrated circuit comprising:
a first memory to store boot instructions, the boot instructions including first instructions defining a first boot sequence, second instructions defining a second boot sequence, and third instructions defining a third boot sequence;
a storage element to store one of a first state and a second state, wherein the first state indicates a secure mode and the second state indicates a less secure mode;
security feature circuitry to perform one or more security features;
a processor configured to:
determine whether the storage element stores the first state or the second state;
execute the first boot sequence when the storage element stores the first state; and
execute a selected one of the second and third boot sequences when the storage element stores the second state;
wherein the security feature circuitry is caused to be in the secure mode in response to the execution of the first boot sequence when the storage element stores the first state and is caused to be in the less secure mode in response to the execution of the selected one of the second and third boot sequences when the storage element stores the second state;

a first input/output (I/O) pin, wherein, when the processor determines that the storage element stores the second state, the processor selects the second boot sequence for execution when a signal provided by the first I/O pin indicates a first value and selects the third boot sequence for execution when the signal provided by the first I/O pin indicates a second value;

wherein the value indicated by the signal provided by the first I/O pin is stored as information in a second memory, and the processor selects the second boot sequence or the third boot sequence depending on the information in the second memory; and wherein, when the signal provided by the first I/O pin indicates the second value, the processor is configured to cause at least a portion of the third instructions stored in the first memory to be copied into the second memory.

27. The integrated circuit of claim 26, wherein the second boot sequence is a general purpose full boot sequence and the third boot sequence is a general purpose fast boot sequence.

28. The integrated circuit of claim 26, wherein the third boot sequence is faster than the second boot sequence.

* * * * *